(12) United States Patent
Jeon et al.

(10) Patent No.: US 11,334,208 B2
(45) Date of Patent: *May 17, 2022

(54) CONTROL APPARATUS

(71) Applicant: Samsung Electronics Co., Ltd., Suwon-si (KR)

(72) Inventors: Ji Hyun Jeon, Suwon-si (KR); Young Sun Shin, Seongnam-si (KR); Hye Jung Chang, Seoul (KR); Bo Kyu Won, Suwon-si (KR); Chang Ho Ha, Hwasun-gun (KR); Sun Young Seo, Seoul (KR); So Young Yun, Seoul (KR); Ji Yoon Yoon, Seoul (KR); Eun Kyung Hong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

This patent is subject to a terminal disclaimer.

(21) Appl. No.: 16/787,680

(22) Filed: Feb. 11, 2020

(65) Prior Publication Data

US 2020/0183543 A1   Jun. 11, 2020

Related U.S. Application Data

(63) Continuation of application No. 15/110,019, filed as application No. PCT/KR2015/000111 on Jan. 6, 2015, now Pat. No. 10,592,062.

(30) Foreign Application Priority Data

Jan. 6, 2014   (KR) .................. 10-2014-0001554

(51) Int. Cl.
*G06F 3/0481* (2022.01)
*H04L 12/28* (2006.01)
(Continued)

(52) U.S. Cl.
CPC ......... *G06F 3/0481* (2013.01); *G06F 3/0482* (2013.01); *G06F 3/0484* (2013.01);
(Continued)

(58) Field of Classification Search
CPC ............... G06F 3/0481; G06F 3/04842; G06F 3/04883; G06F 3/04845
See application file for complete search history.

(56) References Cited

U.S. PATENT DOCUMENTS 6,727,916 B1   4/2004   Ballard
8,936,604 B2*  1/2015   Mani ............... A61B 17/92
                                         606/100

(Continued)

FOREIGN PATENT DOCUMENTS

CN   101546245 A   9/2009
CN   102436351 A   5/2012
(Continued)

OTHER PUBLICATIONS

Chinese Office Action dated Dec. 18, 2018 in Chinese Patent Application No. 201580002600.4.
(Continued)

*Primary Examiner* — William L Bashore
*Assistant Examiner* — Gregory A Distefano
(74) *Attorney, Agent, or Firm* — Jefferson IP Law, LLP

(57) ABSTRACT

The present invention is a control device that controls an operation of at least one electric device and includes a user interface unit configured to receive an operation command for the at least one electric device, the user interface unit having a notification window associated with the at least one electric device in a home screen; and a control unit configured to, when an event associated with the at least one electric device has occurred, perform control such that notification information associated with the event is dis-
(Continued)

played in the notification window, and when the notification information is selected, perform control such that the home screen is switched to at least one of a service screen and a control screen.

17 Claims, 31 Drawing Sheets

(51) Int. Cl.
| | |
|---|---|
| *G06F 3/04817* | (2022.01) |
| *G06F 3/0488* | (2022.01) |
| *G06F 3/0482* | (2013.01) |
| *H04L 51/04* | (2022.01) |
| *G06F 3/0484* | (2022.01) |
| *G06F 3/04842* | (2022.01) |
| *G06F 3/04845* | (2022.01) |
| *G06F 3/04883* | (2022.01) |
| *G09G 5/12* | (2006.01) |

(52) U.S. Cl.
CPC ........ *G06F 3/0488* (2013.01); *G06F 3/04817* (2013.01); *G06F 3/04842* (2013.01); *G06F 3/04845* (2013.01); *G06F 3/04883* (2013.01); *G09G 5/12* (2013.01); *H04L 12/282* (2013.01); *H04L 51/04* (2013.01); *G09G 2370/02* (2013.01); *G09G 2370/06* (2013.01)

(56) References Cited

U.S. PATENT DOCUMENTS

| | | |
|---|---|---|
| 9,716,680 B2 | 7/2017 | Taler |
| 2004/0141004 A1 | 7/2004 | Cabezas et al. |
| 2009/0244019 A1* | 10/2009 | Choi .................... G06F 3/04883 345/173 |
| 2011/0260964 A1* | 10/2011 | Mujkic ............... G06F 3/04886 345/156 |
| 2011/0264286 A1 | 10/2011 | Park |
| 2012/0316984 A1 | 12/2012 | Glassman |
| 2013/0073690 A1 | 3/2013 | Desalvo et al. |
| 2013/0106613 A1 | 5/2013 | Lee et al. |
| 2013/0145295 A1* | 6/2013 | Booking ............. G06F 3/04883 715/764 |
| 2013/0268446 A1 | 10/2013 | Buschmann et al. |
| 2014/0156081 A1 | 6/2014 | Ha |
| 2014/0189597 A1* | 7/2014 | Kang .................. G06F 3/04817 715/835 |
| 2014/0197934 A1 | 7/2014 | Ha |
| 2014/0282084 A1 | 9/2014 | Murarka et al. |
| 2014/0370938 A1* | 12/2014 | Lee ..................... H04M 1/0266 455/566 |
| 2015/0056974 A1 | 2/2015 | Kim et al. |
| 2015/0188861 A1 | 7/2015 | Esplin et al. |

FOREIGN PATENT DOCUMENTS

| | | |
|---|---|---|
| CN | 103019116 A | 4/2013 |
| KR | 10-2012-0072518 A | 7/2012 |
| KR | 10-2013-0013238 A | 2/2013 |
| KR | 10-2013-0021280 A | 3/2013 |
| KR | 10-1740440 B1 | 5/2017 |

OTHER PUBLICATIONS

"LG HomeChat lets you text with your applicances", published Dec. 30, 2013, taken from https://www.cnet.com/news/u lg-homechat-lets-you-text-with-your-appliances/, pp. 1-14.
Indian Office Action dated Feb. 25, 2020, issued in Indian Patent Application No. 201617020668.

* cited by examiner

FIG. 22
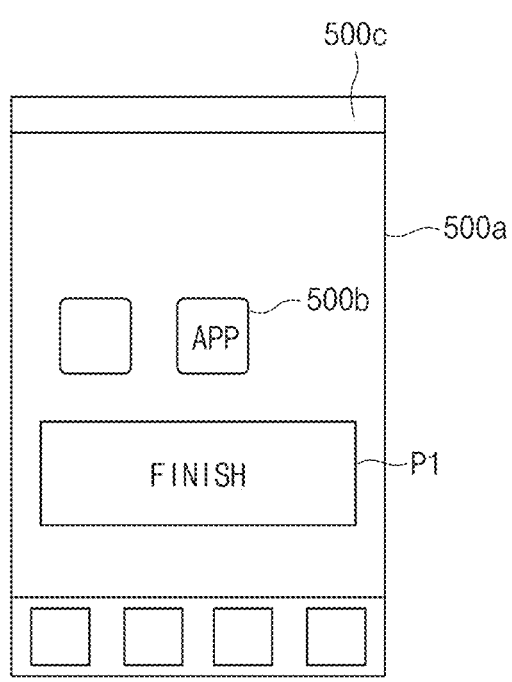
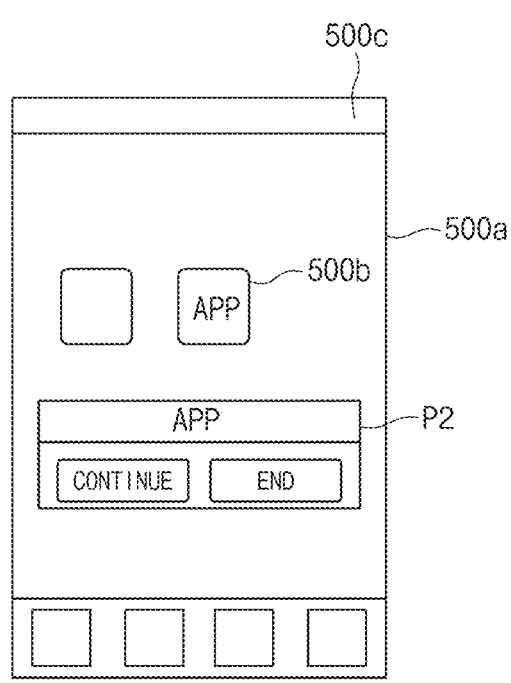

FIG. 26
(a)  (b)
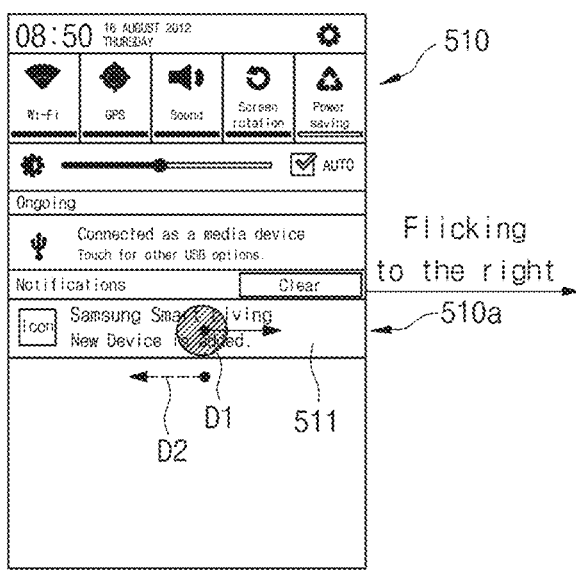
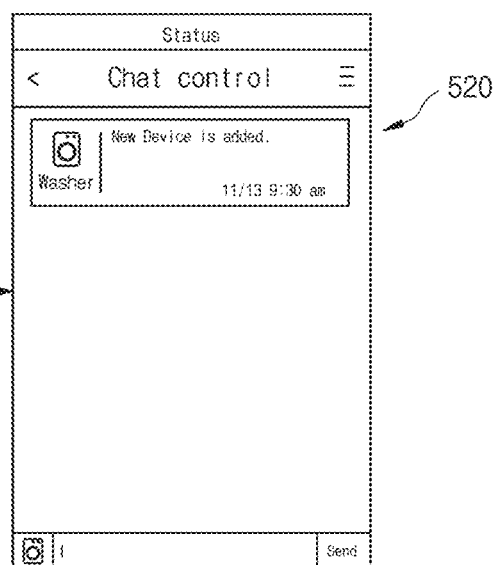
(c)  (d)
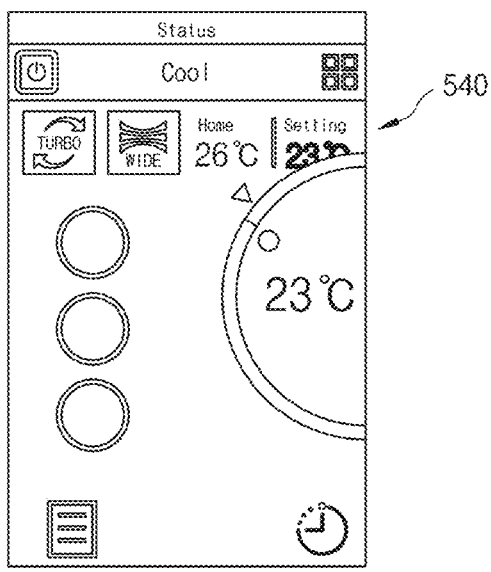
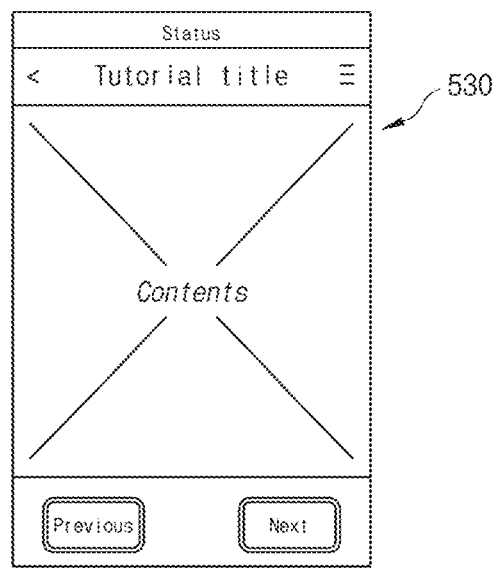

FIG. 27
(a)
(b)
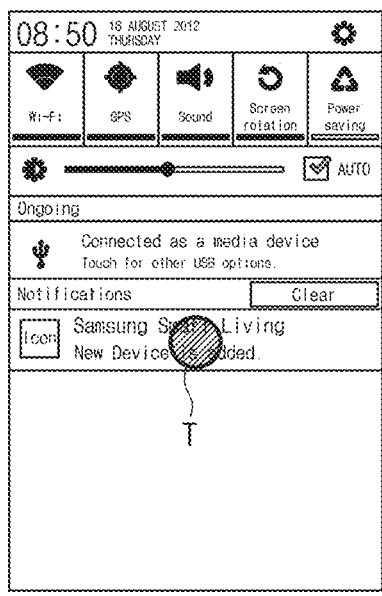
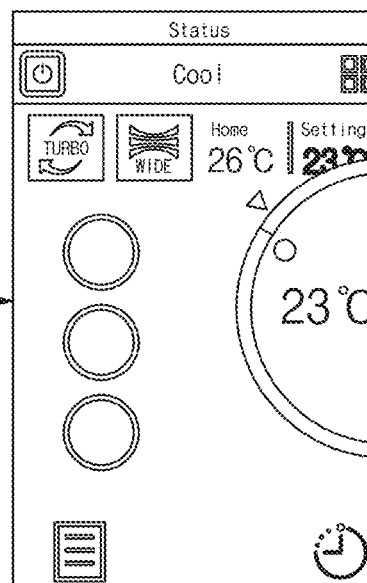
(c)
(d)
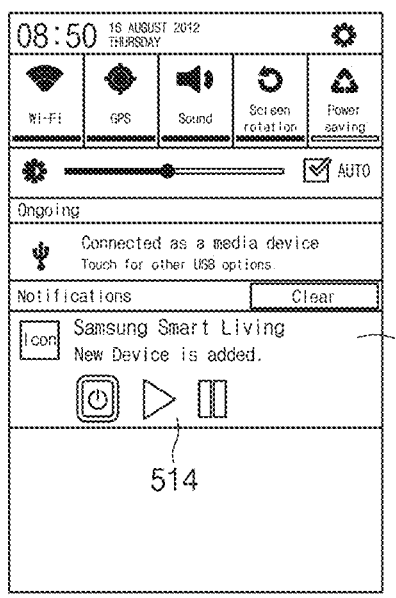
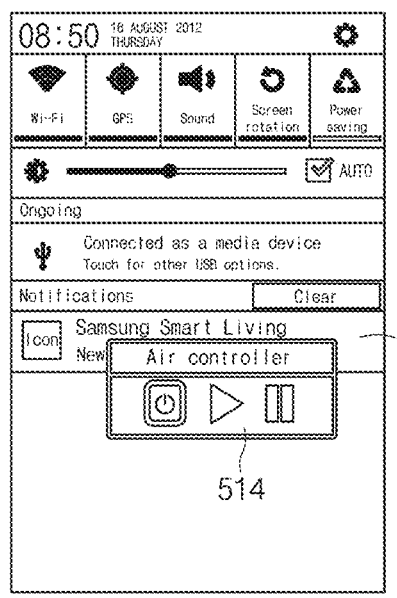

CONTROL APPARATUS

CROSS-REFERENCE TO RELATED APPLICATION(S)

This application is a continuation application of prior application Ser. No. 15/110,019, filed on Jul. 6, 2016, which application is a U.S. National Stage application under 35 U.S.C. § 371 of an International application filed on Jan. 6, 2015 and assigned application number PCT/KR2015/000111, which claimed the benefit of a Korean patent application filed on Jan. 6, 2014, in the Korean Intellectual Property Office and assigned Serial number 10-2014-0001554, the entire disclosure of which is hereby incorporated by reference.

TECHNICAL FIELD

The present invention relates to a control device for monitoring and controlling home appliances.

BACKGROUND ART

Recently, along with the rapid development of wired/wireless data communication technology and the broad distribution of communication networks, high-speed communication services such as the Internet have been widely popularized. In particular, as high-speed Internet service has been provided in households, conventional PC-based network technology has developed into home network technology for remotely controlling digital home appliances.

A home network system is a system for connecting digital home appliances, sensors, light fixtures, heating and cooling devices, gas devices, and so on over a wired or wireless local area network to control appliances desired by a user anywhere at any time.

Such a home network system typically includes a home server (or a home monitoring gateway) that functions as a master, a plurality of home network devices (hereinafter referred to as control target devices) that are monitored and controlled by the home server, and a controller that locally or remotely monitors and controls a plurality of control target devices through a connection with only the home server.

In this case, the home server is generally implemented on a residential gateway (RG) or a wall pad, and a controller is generally implemented in a wall pad, a TV, a cell phone, a computer, etc. The home server and the controller may be integrated and implemented as one device. For example, a TV may serve as the control device in addition to the home server.

In the home network system, the home server may automatically recognize control target devices, for example, a TV, a refrigerator, a lamp, a microwave, a sensor, a boiler, and a washing machine, which are connected to a home network through various physical media (e.g., a power line, a serial communication such as RS-232, Ethernet, etc.), and may display the recognized home network devices on a screen to control devices desired to be controlled by a user.

The controller monitors and controls a plurality of control target devices through communication with the home server.

In the home network system, the home server transmits data to or receives data from an external network, which is mainly implemented as an Internet network.

The user uses a control device such as a PC, a notebook, a smal (phone, a tablet PC, a TV, a wearable device, and various remote controllers to access the home server located inside or outside the home and then access a plurality of home appliances connected to the home network inside the home.

In addition, when a plurality of electric devices are registered with an external server, the user accesses the plurality of electric devices registered with the external server via the external server, irrespective of the home server.

When the user uses the control device to monitor and control the control target devices inside the home, the use should select one of the control target devices, access the selected control target device over a network, perform authentication, and then monitor or control the control target device. Thus, it is difficult for the user to use the control device.

For example, home appliances such as an air conditioner or air cleaner for conditioning an air and a humidifier for adjusting humidity are usually controlled together. In this case, the user should inconveniently and inefficiently issue an operation control command to each electric device.

DISCLOSURE

Technical Problem

One aspect provides a control device having a notification window for informing of an operation event of an electric device and configured to display a chatting unit screen for chatting with the electric device when the notification window is touched as an input.

Another aspect provides a control device including an overview unit having an icon of a home electric appliance, a speech bubble configured to display an operation state of the home electric device, and a movement button for laterally moving a screen on which an icon is displayed when an app for a home network is executed.

Still another aspect provides a control device including a master key having a plurality of buttons for integrally controlling home electric devices on the basis of a predetermined operation command when an app for a home network is executed.

Yet another aspect provides a control device including a chatting unit for chatting with a home electric appliance using a shortcut button having a predetermined chatting word when an app for a home network is executed.

Technical Solution

In accordance with an aspect, a control device for controlling an operation of at least one electric device includes a user interface unit configured to receive an operation command for the at least one electric device, the user interface unit having a notification window associated with the at least one electric device in a home screen; and a control unit configured to, when an event associated with the at least one electric device has occurred, perform control such that notification information associated with the event is displayed in the notification window, and when the notification information is selected, perform control such that the home screen is switched to at least one of a chatting screen, a service screen, and a control screen.

The notification window includes a message unit that informs of information on the event having occurred and a button unit for switching a screen, and the control unit performs control such that the home screen is switched to the chatting screen when the message unit is selected and performs control such that the home screen is switched to a control screen for controlling the at least one electric device when the button unit is selected.

The notification window includes a message unit that informs of information on the event and a button unit for switching a screen, and the control unit performs control such that the home screen is switched to the chatting screen when the message unit is selected and performs control such that the home screen is switched to a service screen for providing service information on the at least one electric device when the button unit is selected.

The notification window includes a button unit that displays a current operation state of the at least one electric device and receives an operation command for the at least one electric device, and the control unit performs control such that the current operation state is changed to another operation state when the button unit is selected.

The operation state includes a start state and a stop state.

When the notification window is touched as an input, the control unit checks a touch direction and performs control such that the home screen is switched to at least one of the chatting screen, the service screen, and the control screen based on the checked touch direction.

When the touch direction is a first direction, the control unit performs control such that the home screen is switched to the chatting screen. When the touch direction is a second direction, the control unit performs control such that the home screen is switched to the control screen.

When the notification window is touched as an input, the control unit checks a touch time. When the checked touch time is equal to or greater than a certain time, the control unit performs control such that the home screen is switched to the control screen.

When the notification window is touched as an input, the control unit checks a touch time. When the checked touch time is equal to or greater than a certain time, the control unit performs control such that the notification window is expanded and performs control such that a mini control window is displayed in an area of the expanded notification window.

When the notification window is touched as an input, the control unit checks a touch time. When the checked touch time is equal to or greater than a certain time, the control unit performs control such that a mini control window is displayed to overlap the notification window.

When the notification window is touched as an input, the control unit performs control such that the home screen is switched to the chatting screen and performs control such that a mini control window is displayed to overlap the chatting screen.

The mini control window includes at least one of an on/off button, a start button, a stop button, and a pause button to receive the operation command for the at least one electric device.

When the notification window is selected, the mini control window performs control such that the home screen is switched to the chatting screen and performs control such that a shortcut button for performing an operation corresponding to an event is displayed in the chatting screen.

In accordance with another aspect, a control device for controlling an operation of at least one electric device includes a user interface unit configured to receive an operation command for the at least one electric device, the user interface unit having a home screen; and a control unit configured to, when an event has occurred while the at least one electric device is operated, perform control such that a pop-up window for informing of information on the event having occurred is displayed on the home screen.

The pop-up window includes a positive/negative pop-up window.

The user interface unit further includes a quick panel window disposed in the home screen in a hidden state and a notification window configured to display an operation state of the at least one electric device. When an upper portion of the home screen is dragged, the control unit performs control such that the quick panel window is displayed. When an event has occurred while the at least one electric device is operated, the control unit performs control such that the notification window is displayed in the quick panel window.

Advantageous Effects

According to an aspect, it is possible to allow an operation state of an electric device to be easily checked by displaying a notification window for informing of an operation event of an electric device in a quick panel window of the home screen even when an app is not executed in the user interface unit.

In addition, it is possible to easily access a chatting screen, a control screen, and a service screen by touching a notification window in the quick panel window as an input.

It is also possible to easily and quickly check an operation state of an electric device since the operation state of the electric device is displayed through a pop-up window even when an app is not executed in the user interface unit.

It is also possible to facilitate identification by displaying each of a plurality of home electric appliances and easily check an operation state of the home electric appliance by displaying an operation state of the electric device in the vicinity of the icon as a speech bubble. That is, it is possible to provide convenience to the user.

In addition, since the operation state of the electric device may be changed only by touching an icon, it is possible to easily control the operation of the electric device and integrally control electric devices at the same time using the plurality of buttons of the master key, thus enhancing convenience and efficiency of control of the electric device. It is also possible to rapidly and easily check the state information of the electric device by utilizing a pop-up window to output an event in which the state of the electric device is changed.

Furthermore, it is also possible to simply and easily transmit an operation command to at least one electric device using a shortcut button of the chatting unit.

DESCRIPTION OF DRAWINGS

FIG. 22 is an exemplary diagram of a pop-up window displayed in the home screen of a control device according to another embodiment.

FIGS. 23 to 28 are exemplary diagrams showing an operation of a quick panel window displayed in the home screen of a user interface of a control device according to another embodiment.

MODES OF THE INVENTION

Hereinafter, embodiments of the present invention will be described in detail with reference to the accompanying drawings.

Figure 1:
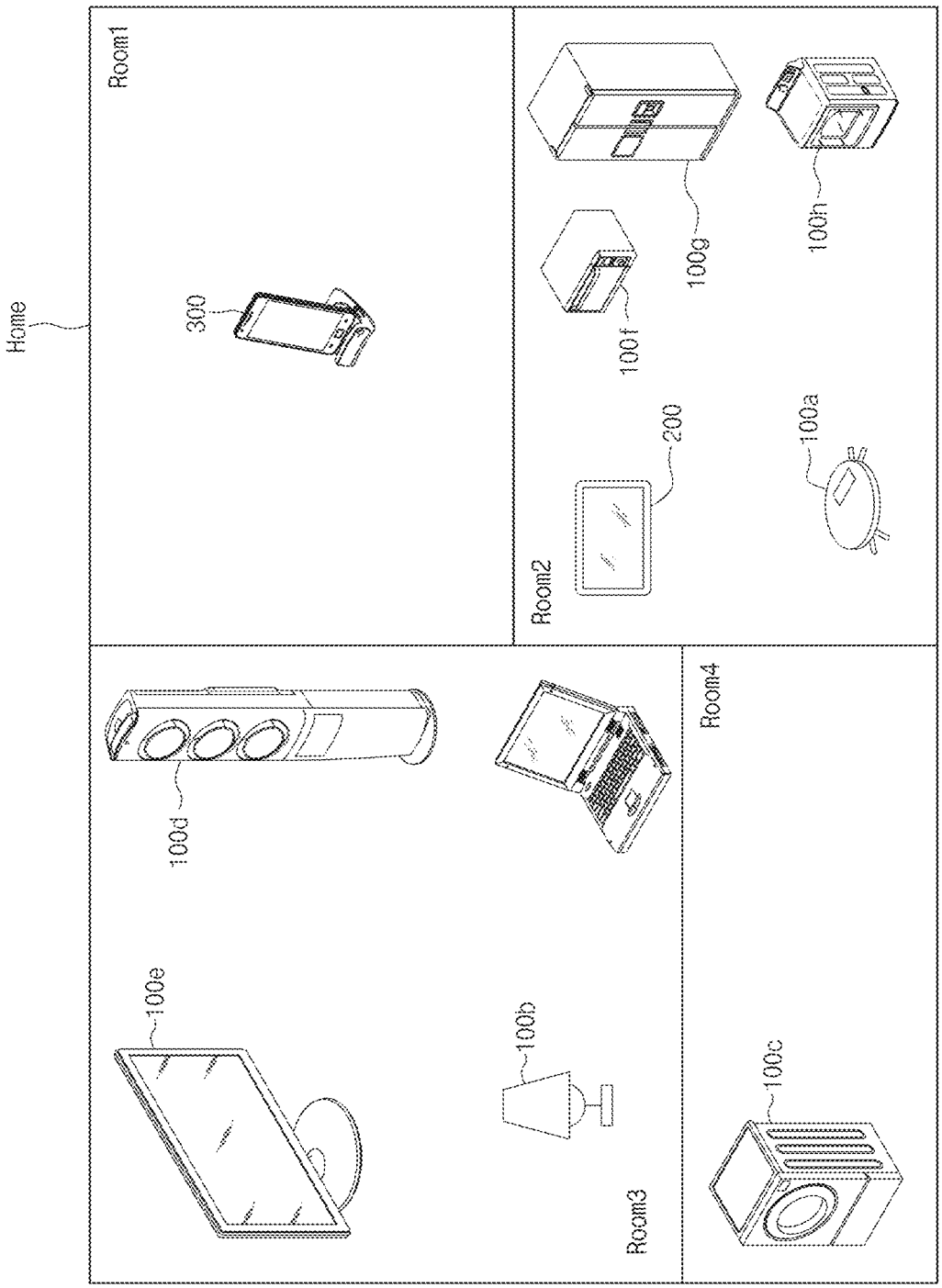
FIG. 1 is an exemplary diagram showing a home network system that communicates with a control device according to an embodiment.
Figure 2:
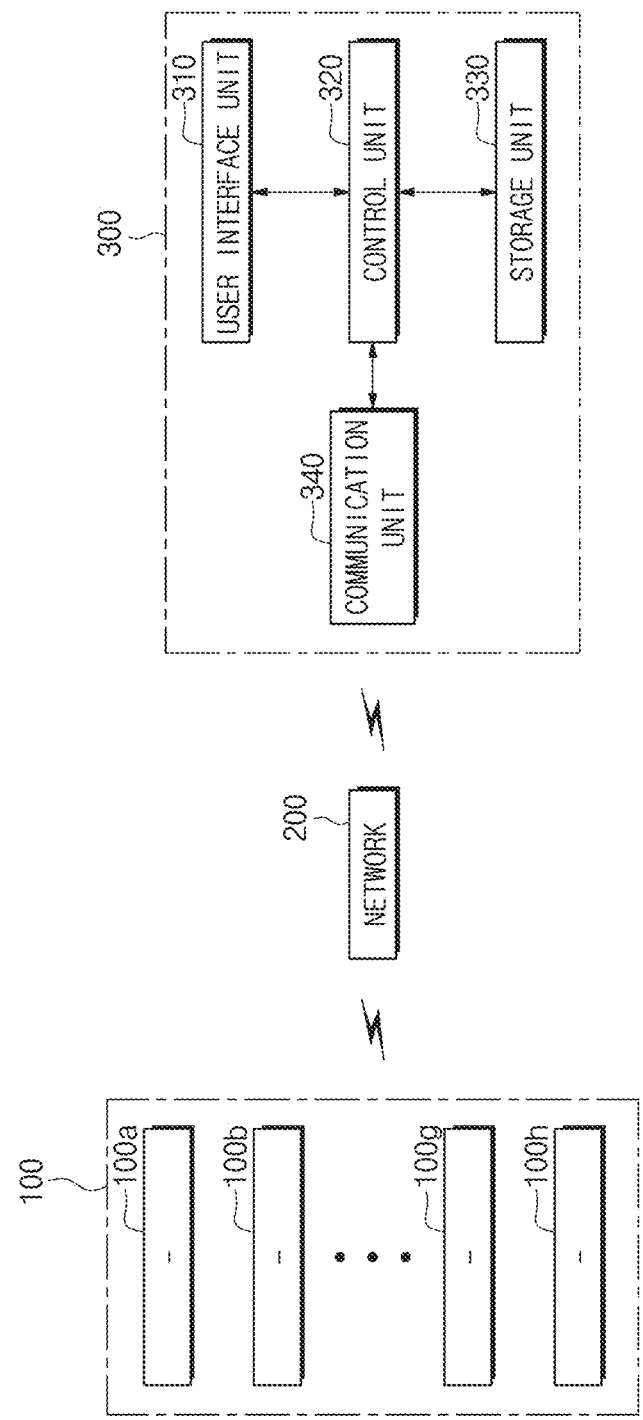
FIG. 2 is a block diagram showing a home network system that communicates with a control device according to an embodiment.

FIG. 1 is an exemplary diagram showing a home network system that communicates with a control device according to an embodiment, and FIG. 2 is a block diagram showing a home network system that communicates with a control device according to an embodiment. The home network system that communicates with the control device includes a plurality of electric devices 100a to 100h and a network.

The electric devices 100a to 110h, each of which is a device that performs a predetermined unique function, transmit operation information corresponding to an operation state by performing an additional function of communicating with the control device over the network, and perform an operation corresponding to an operation command transmitted by the control device. Here, the control device 300 includes a mobile device.

The electric devices include home appliances that are not portable, such as a robot cleaner 100a, a light fixture 100b, a washing machine 100c, an air conditioner 100d, a television 100e, a cooking appliance 100f, a refrigerator 100g, and a dishwasher 100h, and may further include a terminal that is used in the home, such as a notebook, a PC, and a tablet. In addition, the electric devices may further include a security device in which a camera and a microphone are provided.

A network 200 is a home network that enables bidirectional communication by connecting all electric or electronic devices used in the home to one system.

In detail, the network 200 may allow information to be shared between the plurality of electric devices and the control device 300 over the wired/wireless Internet.

Home information transfer methods may be classified into a wired scheme and a wireless scheme. Examples of the wired scheme include a home phoneline networking alliance (PNA) using an existing telephone line, IEEE 1394, a power line, etc. Examples of the wireless scheme include home radio frequency (RF), Bluetooth, Infrared Data Association (IrDA) and wireless LAN (e.g., WiFi), Zigbee, Z-wave, and a short-range communication (e.g., NFC, etc.).

The network 200 includes a home server that manages and controls the plurality of electric devices.

The home server may be implemented on a residential gateway (RG), a wall pad, or a TV.

The home server may be implemented in software and provided in various electric devices or various control devices in the home. In addition the home server may be implemented in hardware and combined with various electric devices or various mobile devices in the home.

That is, the home server displays operation states of the plurality of electric devices in the home, receives an operation command for at least one of the plurality of electric devices from a user, and then transmits the operation command to the at least one electric device.

The control device 300 communicates with at least one of the plurality of electric devices through wired or wireless communication.

In addition, the control device 300 may communicate with each of the plurality of electric devices in the home, and may transmit or receive information of the plurality of electric devices through communication with the home server.

The control device 300 includes an app for communicating with the home network to monitor and control the plurality of electric devices in the home. When the app is executed by the user, the control device 300 outputs an operation state of at least one of the plurality of electric devices in the home, receives an operation command from the user, and controls an operation of the at least one electric device on the basis of the received operation command.

The control device 300, which is a terminal device movable to the outside of the home such as a smartphone, a tablet PC, a notebook, etc., or a device fixed inside the home such as a TV, various remote controllers, etc., may be a terminal device in which an app provided by a content provider may be installed, and may be a device having an app, software, or firmware built therein when the device is manufactured by a manufacturer.

As shown in FIG. 2, the control device 300 includes a user interface unit 310, a control unit 320, a storage unit 330, and a communication unit 340.

The user interface unit 310 outputs operation states of pre-registered electric devices among the plurality electric devices disposed in the home and receives an operation command for at least one of the pre-registered electric devices.

The user interface unit 310 includes a display unit for displaying the operation states of the pre-registered electric devices and an input unit for receiving the operation command from the user.

Here, the input unit is a touch panel for receiving an operation command, and the user interface unit 310 may be implemented as a touch screen in which a display panel of the display unit and the touch panel of the input unit are integrally formed.

In addition, the input may be received by the input unit through an electronic pen, a pointing device (mouse, etc.), and a keyboard in addition to the touch panel. In this case, the input unit may be formed separately from the display panel of the display unit. However, when the input unit is a touch type electronic pen, the input unit may be formed integrally therewith.

The user interface unit 310 includes a home screen on which icons for various apps are displayed.

The user interface unit 310 displays an icon of an app for monitoring and controlling an electric device on the home screen, transmits an app selection signal to the control unit 320 when the icon of the app is selected by the user, and displays a screen corresponding to execution of the app on the basis of a command of the control unit 320. The screen display configuration of the user interface unit will be described below.

When the app is executed, the control unit 320 controls the user interface unit 310 such that operation states of pre-registered electric devices are output, and controls transmission of a signal corresponding to an operation command for at least one electric device on the basis of an operation command input to the user interface unit 310.

The control configuration of the control unit 320 will be described below in association with the screen display configuration of the user interface unit.

The storage unit 330 stores identification information of home electric devices registered by the user and an app for monitoring and controlling the pre-registered electric devices.

The storage unit 330 stores an operation command for a pre-registered electric device for each button of a master key and stores an operation command for an electric device for each shortcut button of a chatting unit.

The communication unit 340 communicates with the pre-registered electric devices.

Furthermore, the communication unit 340 may also communicate with the home server.

The user interface unit 310 will be described in detail with reference to FIGS. 3 to 20. In addition, a control operation of the control unit 320 will also be described.

Figure 3:
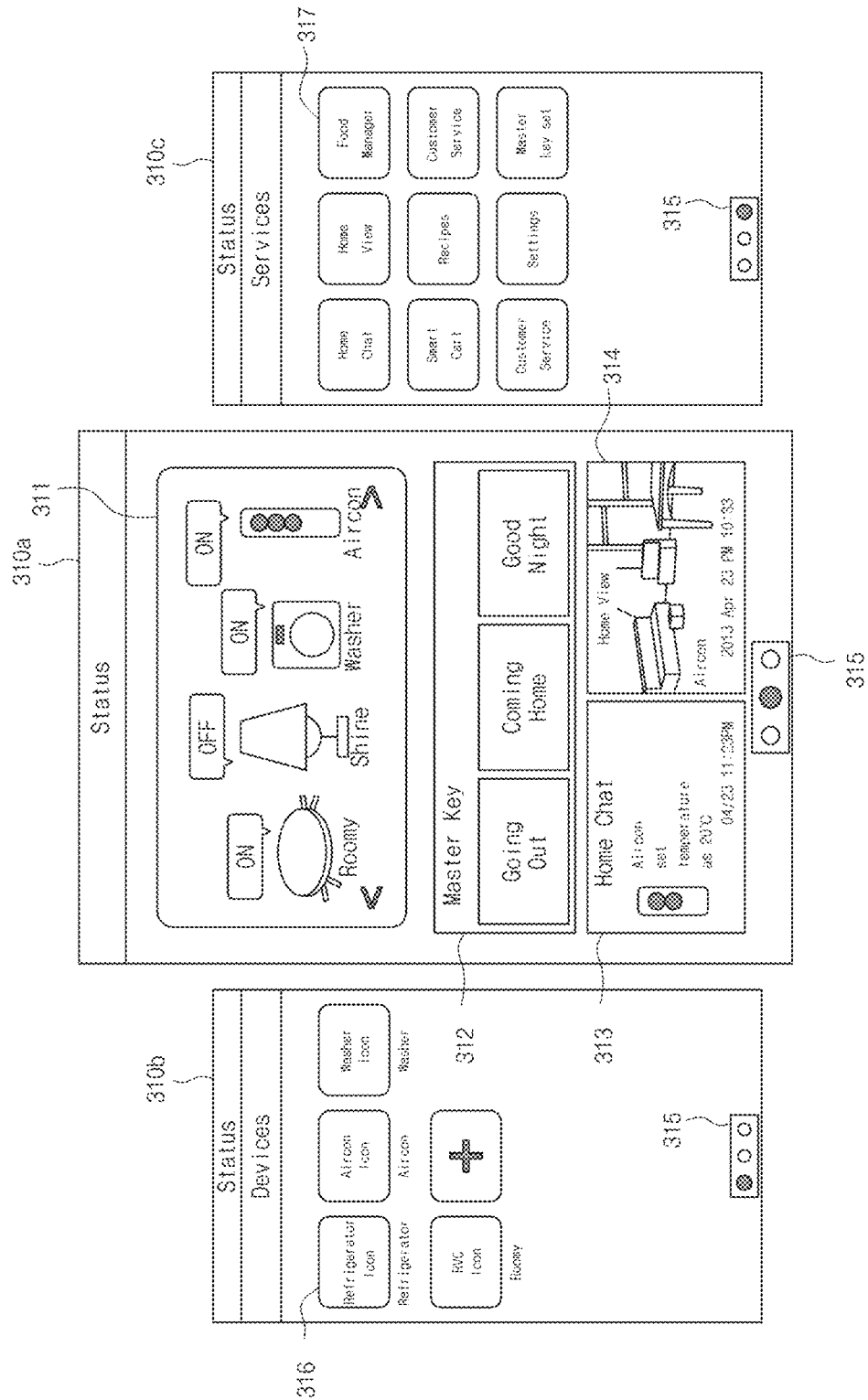
FIG. 3 is an exemplary diagram showing a dashboard screen and a plug-in screen of a control device according to an embodiment.

FIG. 3 is an exemplary diagram showing a dashboard screen and a plug-in screen of a control device according to an embodiment.

When the app is executed, the user interface unit 310 displays a dashboard screen 310*a* as an initial screen.

Here, the dashboard screen 310*a* is a screen on which basic information regarding a plurality of electric devices connected through the home network, information for controlling an operation, and so on are displayed.

When a sliding touch is input to the dashboard screen 310*a*, the user interface unit 310 switches the screen from the dashboard screen 310*a* to a plug-in screen 310*b* or 310*c*.

That is, when a sliding touch applied from left to right is input to the dashboard screen 310*a*, the user interface unit 310 displays a first plug-in screen 310*b* on which a device registration item for registering an electric device is displayed. When a sliding touch applied from right to left is input to the dashboard screen 310*a*, the user interface unit 310 displays a second plug-in screen 310*c* on which a service item for servicing and setting the electric device is displayed.

In addition, when a sliding touch applied from right to left is input while the first plug-in screen 310*b* is displayed, the user interface unit 310 displays the dashboard screen 310*a*.

According to the embodiment, the number of plug-in screens is two, but may be one or three or more.

The control unit 320 checks a screen being displayed, performs switching control such that a screen positioned at the right side of the current screen is displayed when the sliding touch applied from right to left is input, and performs switching control such that a screen positioned at the left side of the current screen is displayed when the sliding touch applied from left to right is input.

For example, when a sliding touch is input while the dashboard screen 310*a* is displayed, the control unit 320 checks a sliding touch direction. The control unit 320 controls switching to the first plug-in screen 310*b* when the checked sliding touch direction is from left to right, and controls switching to the second plug-in screen 310*c* when the checked sliding touch direction is from right to left.

The dashboard screen 310*a* includes an overview unit 311 for displaying list information and operation information of pre-registered electric devices and widget units 312, 313, and 314 for displaying execution command information and monitoring information for rapidly and easily controlling operations of the pre-registered electric devices.

In addition, the dashboard screen 310*a* further include a screen switching unit 315 configured to directly switch from the dashboard screen to the plug-in screen, directly switch from the plug-in screen to the dashboard screen, or directly switch from one plug-in screen to another plug-in screen.

The term "direct switching" includes switching the screen through a single touch rather than the sliding touch.

That is, the screen switching unit 315 includes page buttons equal in number to the plurality of screens. The arrangement of the plurality of page buttons corresponds to that of the plurality of screens. A page button corresponding to the position of the currently displayed screen is displayed differently from the remaining page buttons. Thus, the user may recognize the position of the currently displayed screen.

In addition, arrangement information of the plurality of screens may be preset, and the arrangement of the screens may be changed by the user.

For example, the user interface unit according to the embodiment includes a total of three screens, that is, the dashboard screen, the first plug-in screen, and the second plug-in screen. For the arrangement of the three screens, the first plug-in screen is disposed at the left side of the dashboard screen, and the second plug-in screen is disposed at the right side of the dashboard screen.

Thus, there are a total of three page buttons of the screen switching unit 315. Among the three page buttons, a left page button is linked with the first plug-in screen 310*b*, a center page button is linked with the dashboard screen 310*a*, and a right page button is linked with the second plug-in screen 310*c*.

When the left page button is touched, the first plug-in screen 310*b* is displayed on the user interface unit. In this case, the left page button has a different color from other buttons.

When the center page button is touched, the dashboard screen 310*a* is displayed on the user interface unit. In this case, the center page button has a different color from other buttons.

When the right page button is touched, the second plug-in screen 310*c* is displayed on the user interface unit. In this case, the right page button has a different color from other buttons.

That is, the control unit 320 performs control to check the page button touched among the plurality of page buttons of the screen switching unit 315, check a screen corresponding to the checked page button, and display the checked screen on the user interface unit 310.

The first plug-in screen 310*b* and the second plug-in screen 310*c* are each a screen for changing setting information of a main function, setting an additional function, or receiving a service.

In detail, the first plug-in screen 310*b* includes a device check button having registration information regarding a pre-registered electric device and a registration setting button 316 for registering a new device.

The second plug-in screen 310c includes a setting change button for changing settings of a master key, a chatting unit, and a home view unit of a widget unit, a service button for receiving a service for the pre-registered electric device, and a management button 317 for each pre-registered electric device.

Figure 4:
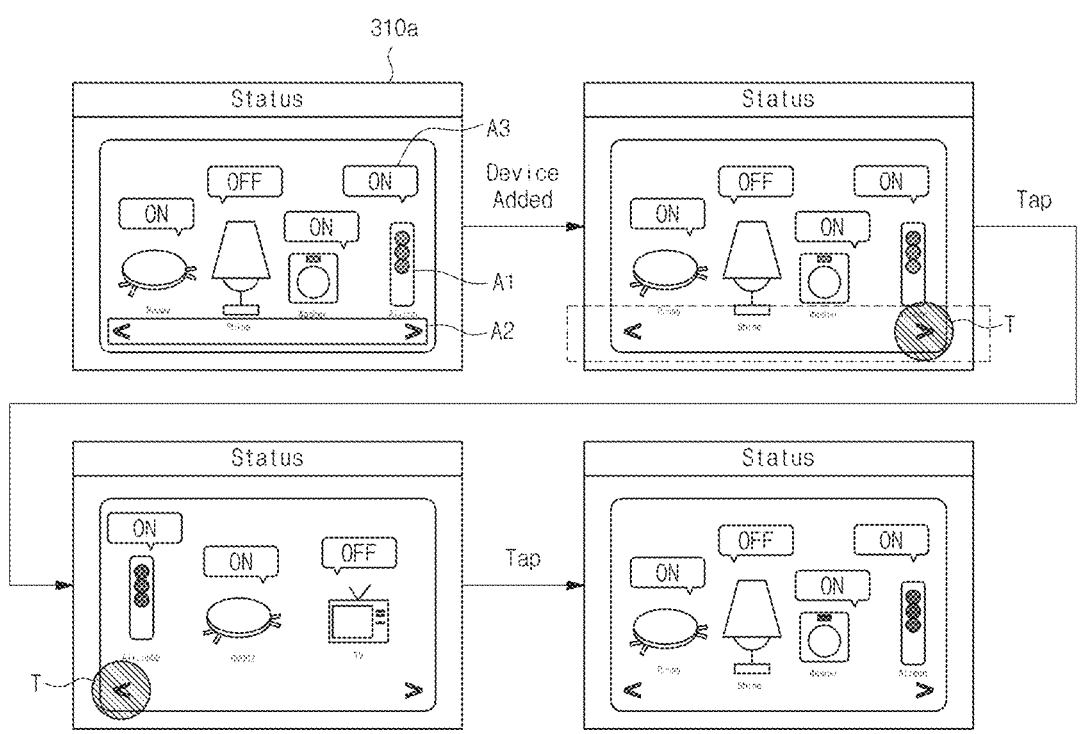
FIGS. 4 to 6 are exemplary diagrams showing an execution of an overview unit in the dashboard screen of a control device according to an embodiment.
Figure 5:
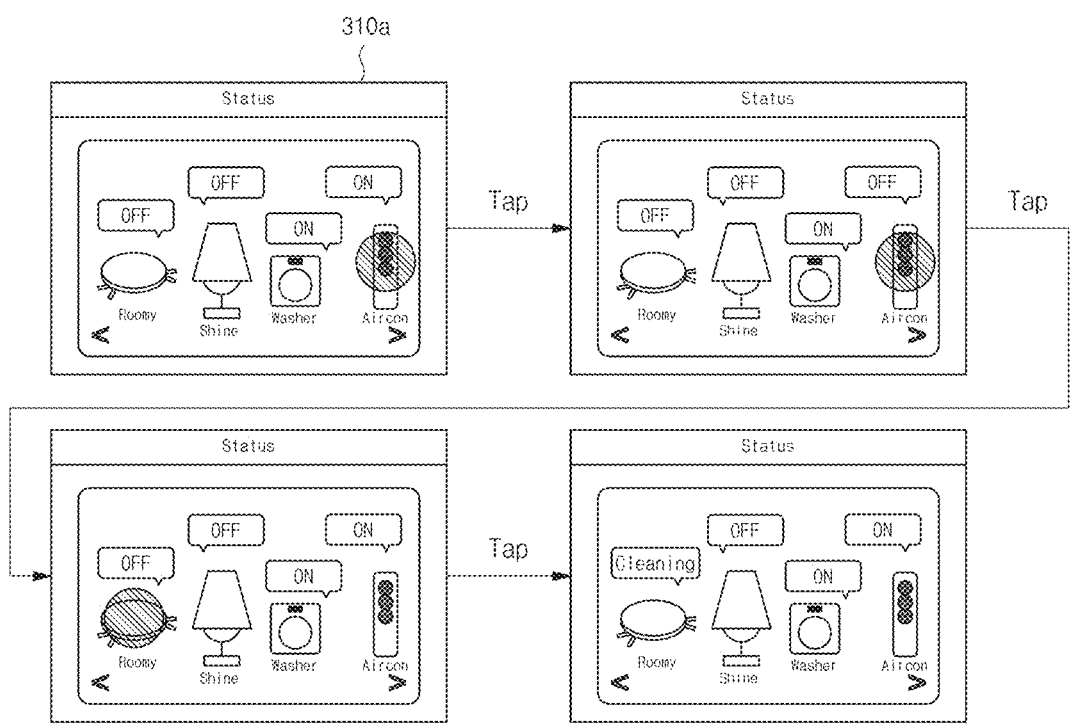
Figure 6:
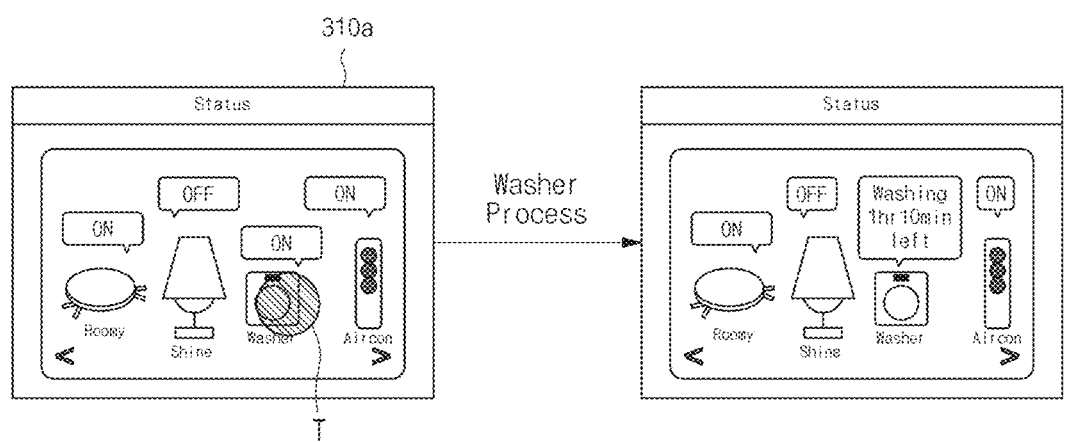

FIGS. 4 to 6 are exemplary diagrams showing an execution of an overview unit in a dashboard screen of a control device according to an embodiment. The overview unit 311 will be described in detail with reference to FIGS. 4 to 6.

As shown in FIG. 4, the overview unit 311 displays a list of pre-registered electric devices and displays icons A1 of the pre-registered electric devices.

In addition, the overview unit 311 further includes a movement button A2 for moving a screen on which the icons of the pre-registered electric devices are arranged.

That is, the movement button A2 is a button for moving the currently displayed icon to change a display position of the icon in order to display icons of the remaining electric devices that are hidden and not displayed on one screen in the overview unit.

In this case, the movement button A2 is in a hidden state when the number of icons of the pre-registered electric devices is less than a predetermined number of icons that can be displayed on one screen. The movement button A2 is in a displayed state when the number of icons of the pre-registered electric devices is greater than the predetermined number of icons that can be displayed on one screen.

The movement button A2 includes a first direction button < that instructs to move from a currently displayed screen to a screen extending in a first direction, and a second direction button > that instructs to move from the current displayed screen to a screen extending in a second direction. Here, the second direction is a direction opposite to the first direction.

When the first direction button < is selected, the overview unit 311 shifts icons of a predetermined number of electric devices in the current screen by one column in the second direction to rearrange the icons. When the second direction button > is selected, the overview unit 311 shifts icons of a predetermined number of electric devices in the current screen by one column in the first direction to rearrange the icons.

In this case, when the first direction button < is selected, the overview unit 311 rearranges an icon of a new electric device at the leftmost column of the screen and removes an icon of an electric device that has been positioned at the rightmost column. When the second direction button > is selected, the overview unit 311 rearranges an icon of a new electric device at the rightmost column and removes an icon of an electric device that has been positioned at the leftmost column.

In addition, when the first direction button < is selected, the overview unit 311 displays a screen positioned at the left side of the current screen and displays an icon of an electric device arranged on the left screen. When the second direction button > is selected, the overview unit 311 displays the screen positioned at the right side of the current screen and displays an icon of an electric device arranged on the right screen.

As shown in FIG. 4, when the second direction button > is touched while icons of a cleaner, a light fixture, a washing machine, and an air conditioner are arranged on the current screen of the overview unit 311, icons of an air conditioner2, a robot cleaner2, and a television positioned on the right screen of the current screen are displayed.

When the first direction button < is touched while the icons of the air conditioner2, the robot cleaner2, and the television are displayed, the overview unit 311 moves the currently displayed screen to the left screen and displays the icons of the cleaner, the light fixture, the washing machine, and the air conditioner positioned on the left screen again.

Although the movement button of the overview unit 311 is touched, the control unit 320 controls the user interface unit 310 such that screens of the widget units 312, 313, and 314 are maintained in the current state.

In addition, the overview unit 311 further includes a speech bubble A3 that informs about an on/off state or a progressive state, which indicates a current operation state, of a pre-registered electric device. The speech bubble A3 is positioned in the vicinity of the icon A1 such that the speech bubble A3 is easily recognized by the user.

The speech bubble A3 changes a notification indicating an operation state of an electric device on the basis of a command of the control unit 320.

That is, when any one of the icons displayed in the overview unit 311 is touched, the control unit 320 changes the operation state of the electric device corresponding to the touched icon and controls the user interface unit 310 such that the changed operation state is displayed in a speech bubble.

For example, when the icon of the air conditioner is touched while the air conditioner is in an on state, the control unit 320 controls the air conditioner to be powered off and controls the user interface unit 310 such that the off state of the air conditioner is displayed in the speech bubble. When the icon of the air conditioner is touched while the air conditioner is in an off state, the control unit 320 controls the air conditioner to be powered on and controls the user interface unit 310 such that the on state of the air conditioner is displayed in the speech bubble.

As shown in FIG. 5, on a condition that the icons of the robot cleaner, the light fixture, the washing machine, and the air conditioner are displayed, the overview unit 311 utilizes the speech bubble to inform that the operation of the air conditioner is powered off when the icon of the air conditioner that is powered on is touched, and utilizes the speech bubble to inform that the operation of the robot cleaner is cleaning when the robot cleaner that is power off is touched.

In addition, when the icon of a washing machine is touched while the washing machine is in an on state, the control unit 320 checks a work-in-progress state of the washing machine and controls the user interface unit 310 such that the checked work-in-progress state of the washing machine is displayed in the speech bubble.

As shown in FIG. 6, when an icon of the washing machine in an on state is touched while the icons of the robot cleaner, the light fixture, the washing machine, and the air conditioner are displayed, the overview unit 311 utilizes the speech bubble to inform that a progress state of the washing machine is "one hour and ten minutes have passed."

In addition, the control unit 320 may check at least one of an update state, an error state, and a reservation state of the pre-registered electric device, and may control the user interface unit such that the checked state information is displayed in the speech bubble.

That is, the speech bubble A3 informs about any one of the update information, the error information, and the reservation information of the electric device.

In addition, when an operation state of at least one electric device is changed in response to a touch input to a master key 312 of the widget unit and a chatting instruction input of a chatting unit 313, the control unit 320 controls the user interface unit 310 such that the changed operation state is displayed in a speech bubble.

The widget unit of the user interface unit 310 includes the master key 312 for operating a pre-registered electric device on the basis of a preset operation command, the chatting unit 313 for chatting with at least one of pre-registered electric devices, and a home view unit 314 that outputs a home interior image. This will be described with reference to FIGS. 7 and 8.

Figure 7:
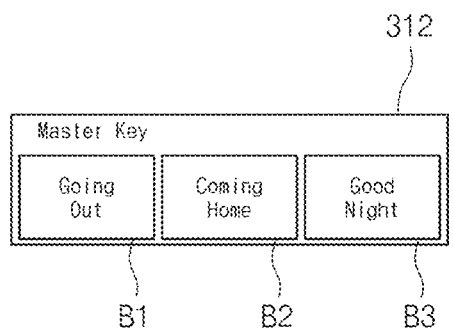
FIG. 7 is an exemplary diagram showing a master key in the dashboard screen of a control device according to an embodiment.

FIG. 7 is an exemplary diagram showing a master key in a dashboard screen of a control device according to an embodiment.

The master key 312 includes a button for integrally controlling operations of a plurality of electric devices. This button previously includes an operation command for each electric device.

The button of the master key 312 may be set on the basis of a user's schedule.

As shown in FIG. 7, the master key 312 includes a going-out button B1, a coming-home button B2, and a good-night button B3.

When the master key 312 of the user interface unit is touched, the control unit 320 checks the touched button to transmit a preset operation command for each electric device corresponding to the checked button to the pre-registered electric device, thus allowing the pre-registered electric device to operate on the basis of the preset operation command. In this case, the user interface unit 310 informs about the operation state of the pre-registered electric device through a speech bubble.

A button for integrally controlling the master key 312 may be additionally added. The addition may be performed through a "master key setting button" of the second plug-in screen.

In addition, the "master key setting button" may be arranged in the master key.

In addition, an operation command for an electric device for each button of the master key 312 may be changed. This change may also be performed through the "master key setting button" of the second plug-in screen.

In addition, the button in which the master key 312 is set may be deleted. This deletion may also be performed through the "master key setting button" of the second plug-in screen.

Figure 8:
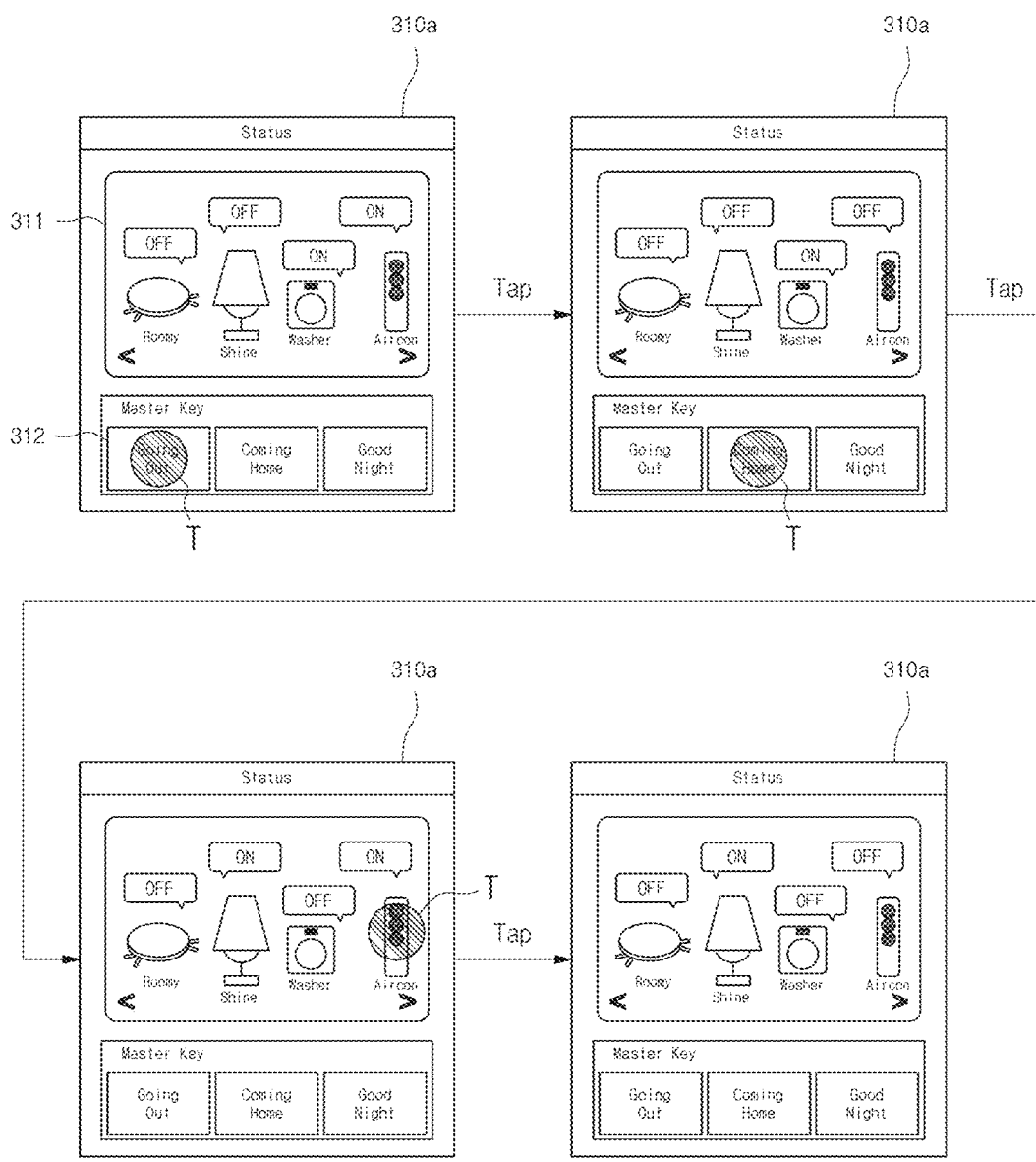
FIG. 8 is an exemplary diagram showing an execution of the master key in the dashboard screen of a control device according to an embodiment.

FIG. 8 is an exemplary diagram showing an execution of a master key in a dashboard screen of a control device according to an embodiment.

As shown in FIG. 8, the overview unit 311 displays icons of a robot cleaner, a light fixture, a washing machine, and an air conditioner and displays a speech bubble that informs about an operation state of each electric device in the vicinity of each of the icons.

It is assumed that the operation command for each electric device corresponding to the going-out button includes powering off the light fixture and powering off the air conditioner, and the operation command for each electric device corresponding to the coming-home button includes powering on the light fixture and powering on the air conditioner.

When the going-out button B1 of the master key 312 is touched (T) while an operation state of the robot cleaner is off, an operation state of the light fixture is off, an operation state of the washing machine is on, and an operation state of the air conditioner is on, the user interface unit 310 maintains the operation states of the robot cleaner and the light fixture in the off state, maintains the operation state of the washing machine in the on state in order to prevent the washing machine from stopping while working, powers off the operation state of the air conditioner, and informs about the operation state of each electric device through a speech bubble.

When the coming-home button B2 of the master key 312 is touched (T) while the operation state of the robot cleaner is off, the operation state of the light fixture is off, the operation state of the washing machine is off, and the operation state of the air conditioner is off, the user interface unit 310 maintains the operation states of the robot cleaner and the washing machine in the off state, powers on the light fixture and the air conditioner, and informs about the operation state of each electric device through a speech bubble. In this case, when a user touches (T) the icon of the air conditioner, the user interface unit 310 powers off the air conditioner and informs about the power-off through a speech bubble.

Figure 9:
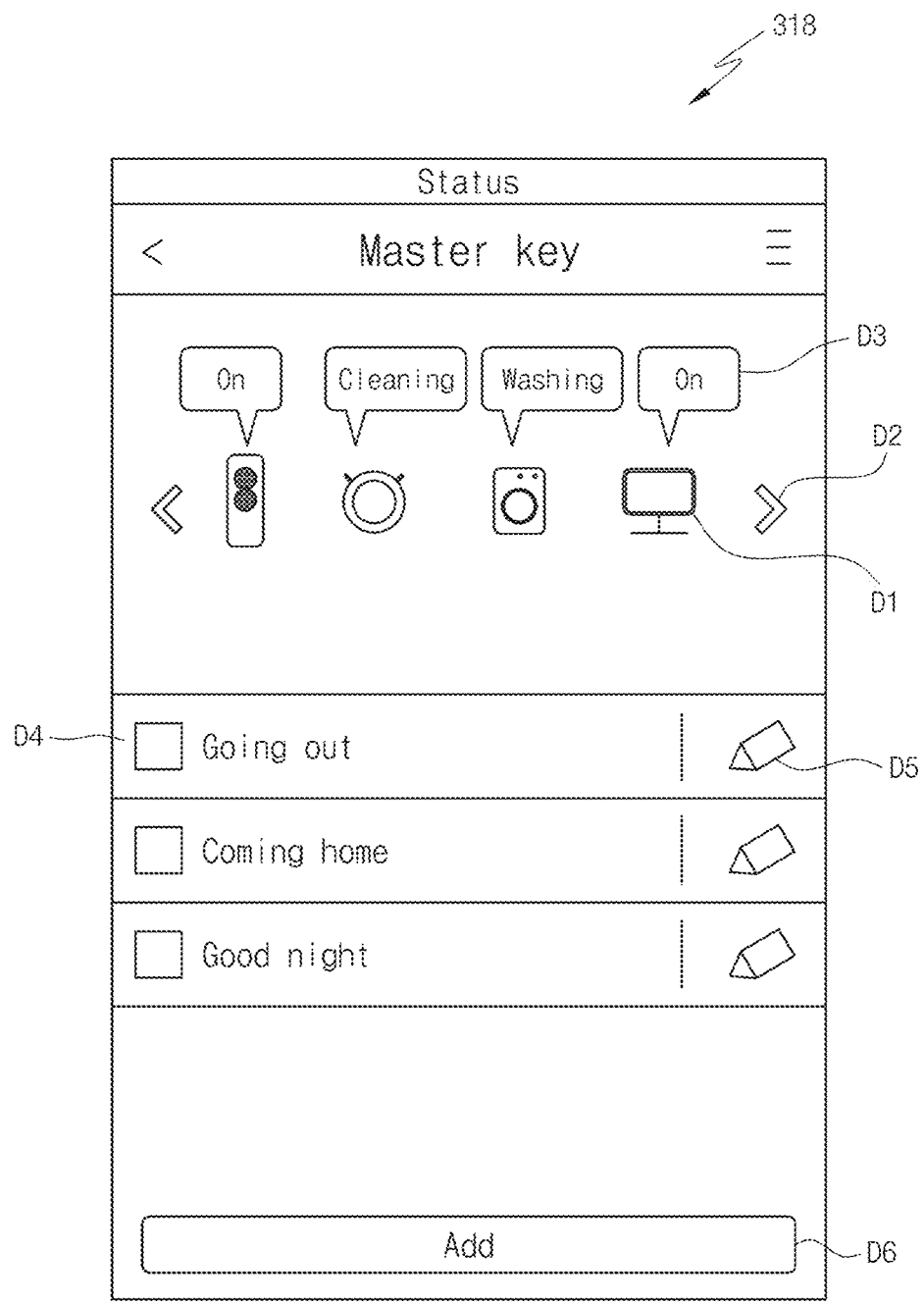
FIG. 9 is an exemplary diagram of a master key setting window (318) in a second plug-in screen of a control device according to an embodiment.
Figure 10:
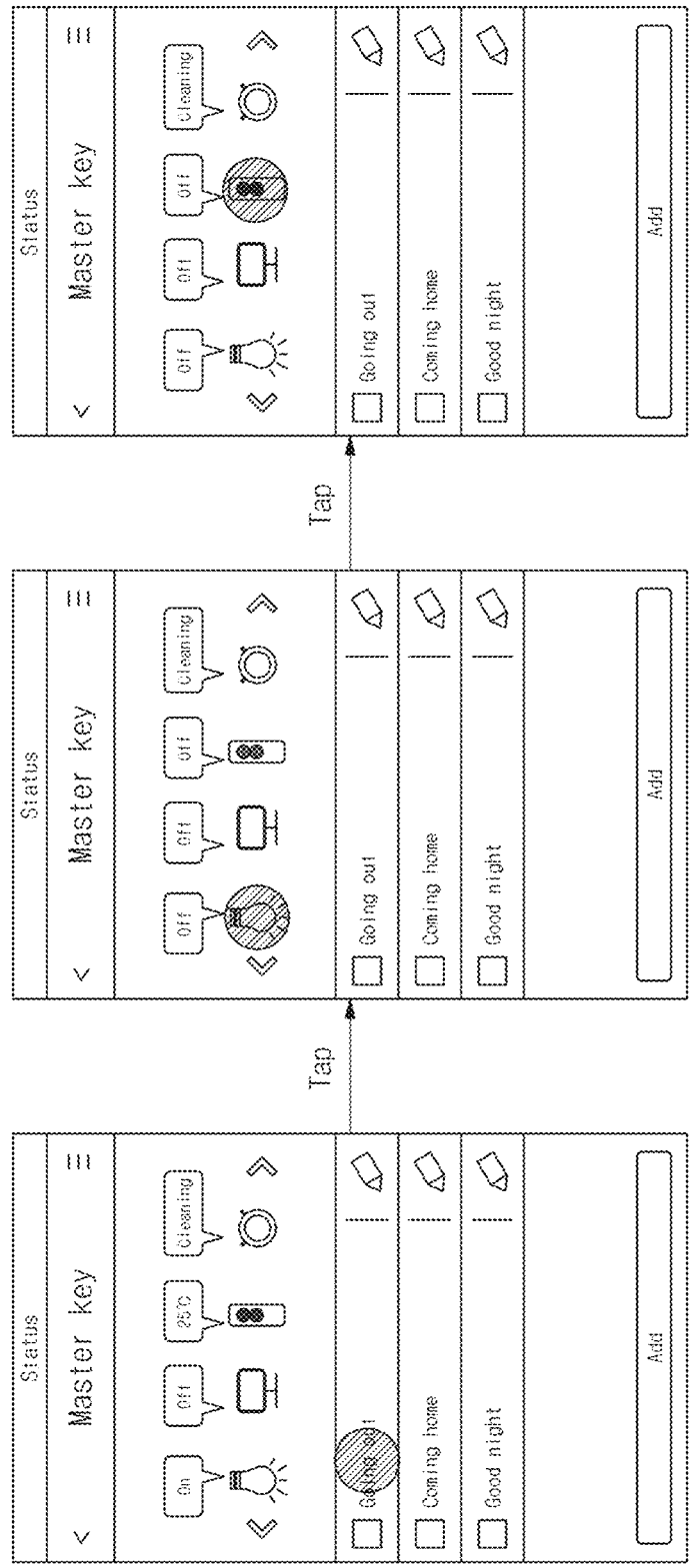
FIGS. 10 and 11 are exemplary diagrams showing the setting of the master key in the second plug-in screen of a control device according to an embodiment.
Figure 11:
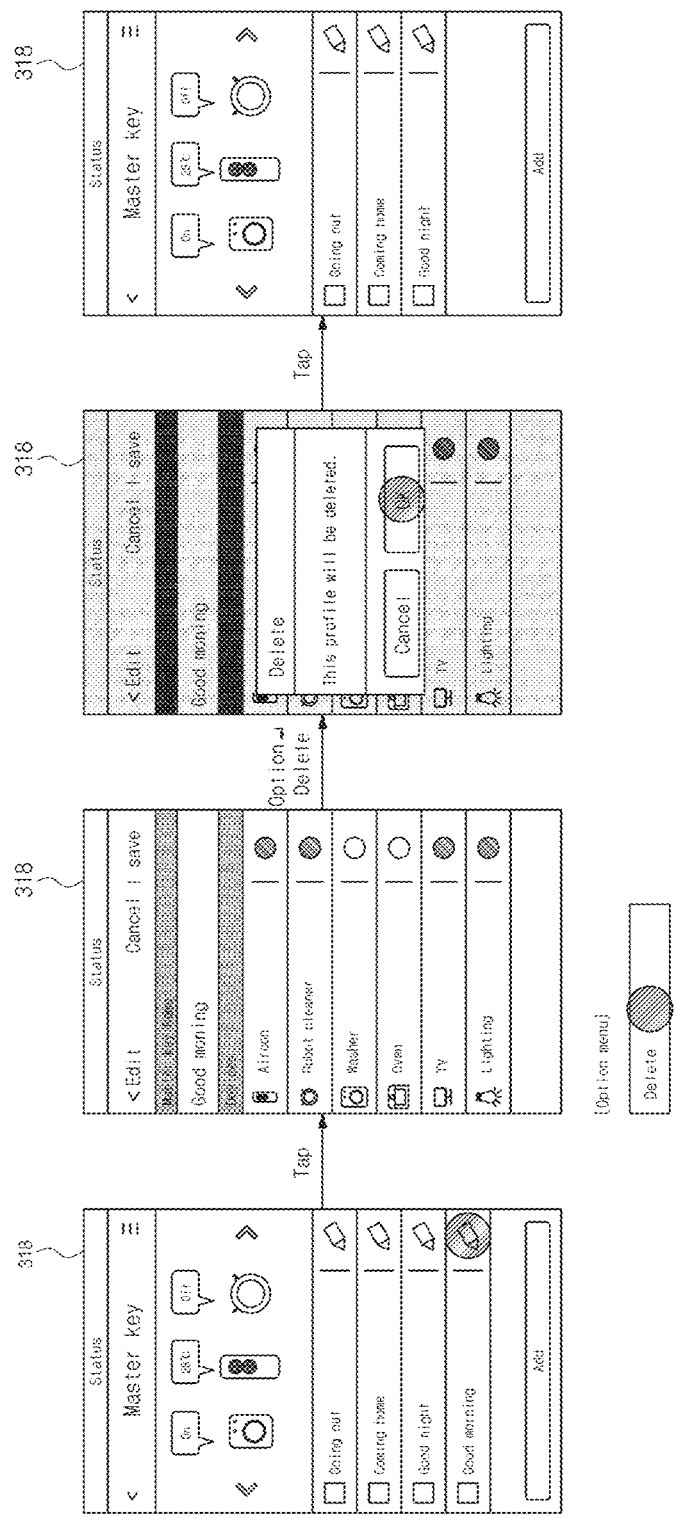

FIG. 9 is an exemplary diagram of a master key setting screen 318 in a second plug-in screen of a control device according to an embodiment, and FIGS. 10 and 11 are exemplary diagrams showing the setting of a master key in a second plug-in screen of a control device according to an embodiment.

When the master key setting button in the second plug-in screen is touched, the user interface unit 310 switches the dashboard screen into the master key setting screen 318.

As shown in FIG. 9, the master key setting screen 318 includes an icon D1 of an pre-registered electric device, a movement button D2 for moving a list of icons of electric devices, a speech bubble D3 that informs an operation command preset for each electric device, and a plurality of pre-registered buttons D4, an editing button D5 of each of the plurality of buttons, and an addition button D6 for adding an integral control button.

As shown in FIG. 10, on a condition that the light fixture is powered on, the television is powered off, the air conditioner is preset to a target indoor temperature of 25° C., and the cleaner is preset to be operating, when the going-out button is selected and the icon of the light fixture is touched, the master key setting screen 318 changes the operation command for the light fixture to an off state and then informs about the change through a speech bubble. When the icon of the air conditioner is touched, the master key setting screen 318 changes the operation command for the air conditioner to be an off state and then informs about the change through a speech bubble.

Thus, the preset command for each electric device corresponding to the going-out button of the master key includes powering off the light fixture, powering off the television, powering off the air conditioner, and operating the cleaner.

As shown in FIG. 11, on a condition that an going-out button, a coming-home button, a good-night button, and a good-morning button are set as integral control buttons, when an editing button of the good-morning button is touched, the master key setting screen 318 displays preset operation command information for each electric device corresponding to the good-morning button. In this case, when a deletion button of an option menu is touched, the master key setting screen 318 displays a window that informs that all information associated with the good-morning button is deleted. When an "OK" button is touched, the master key setting screen 318 displays a plurality of buttons from which the good-morning button has been removed.

FIGS. 12A to 12D are an exemplary diagram of a chatting screen when a chatting unit in a dashboard screen of a control device is executed according to an embodiment and exemplary diagrams illustrating the change in a chatting screen corresponding to a conversation input method.

When a chatting unit 313 is touched, the user interface unit 310 switches a dashboard screen to a chatting screen 319. This is the same as shown in FIG. 12A.

Figure 12A:
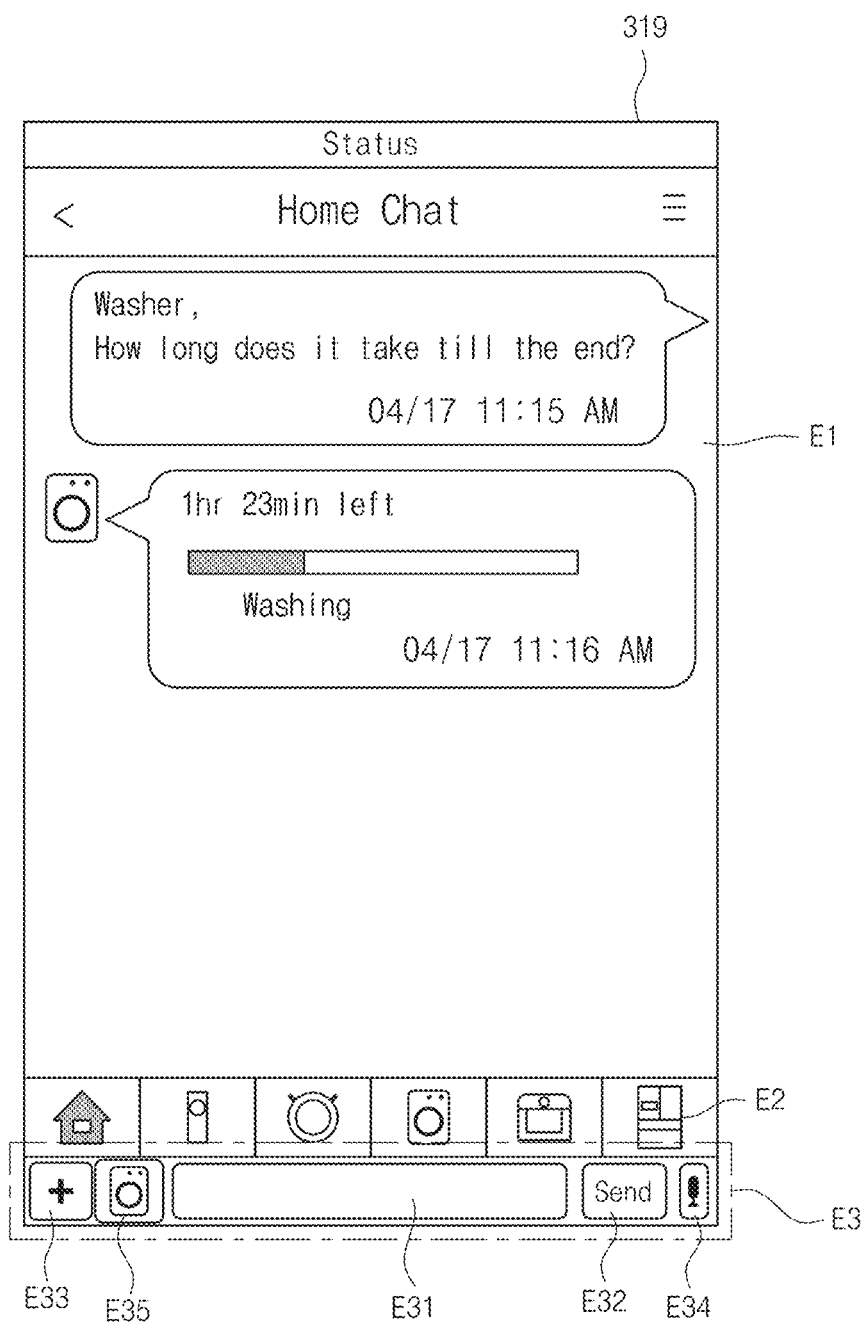
FIGS. 12A to 18 are exemplary diagrams showing the execution of a chatting unit in the dashboard screen of a control device according to an embodiment.

As shown in FIG. 12A, the chatting screen 319 includes a conversation display window E1 for displaying a conversation with at least one electric device, an icon selection window E2 for selecting an icon for at least one electric device or an icon for all electric devices, and a conversation input window E3 for selecting an input method of a conversation with at least one of pre-registered electric devices and inputting the conversation.

Here, the conversation input window E3 includes a text window E31 for selecting a message input method, a send button E32 for instructing to send a text sentence, a list button E33 for instructing to display a list of shortcut buttons implying chatting instructions, a microphone button E34 for instructing to input voice, and a target window E35 for displaying an icon of an electric device with which the user chats.

When a touch is input, the text window E31 displays a QWER type keypad E36.

In addition, the keypad E36 includes a button for switching to Korean characters or numbers. When the switching button is touched, Korean characters or numbers may be displayed.

Figure 12B:
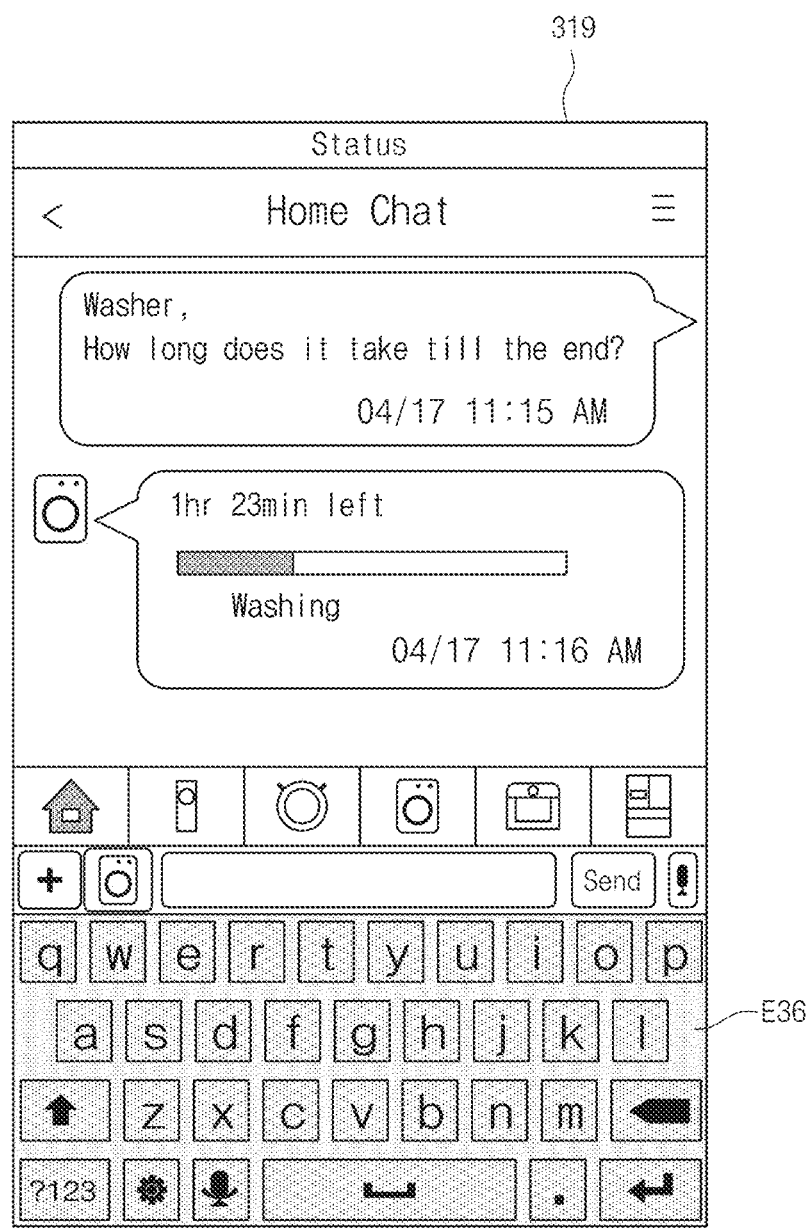
Figure 12C:
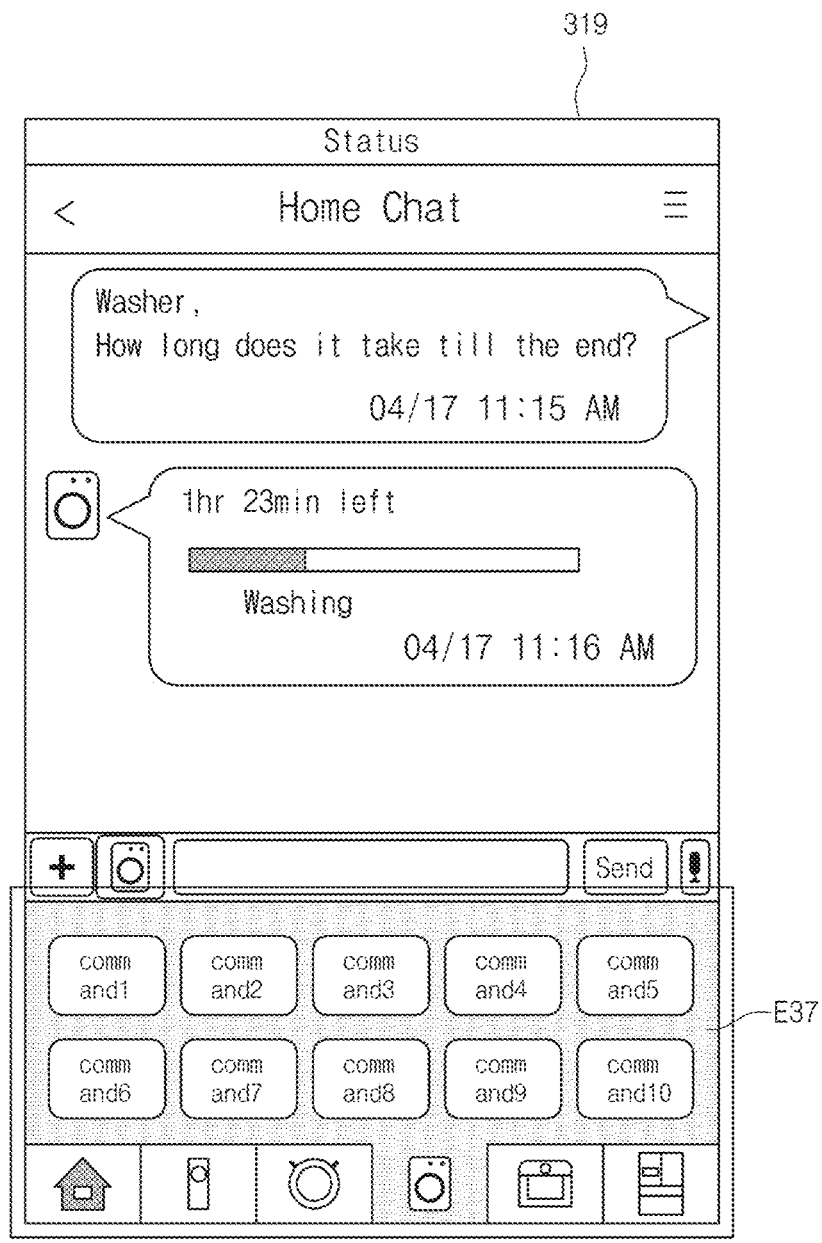
Figure 12D:
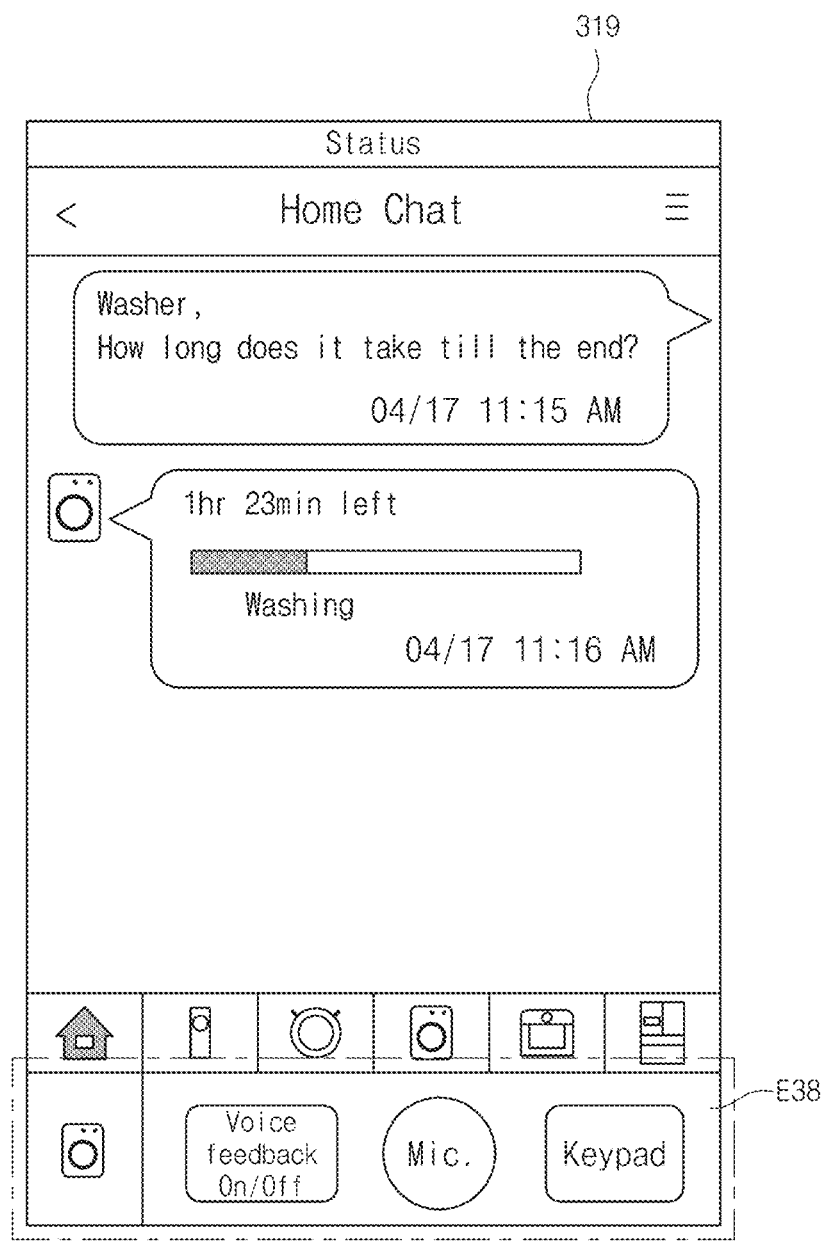

FIGS. 12B, 12C, and 12D are exemplary diagrams illustrating changes in the chatting screen corresponding to a conversation input method. They will be described with reference to FIGS. 13 to 18.

As shown in FIG. 12B, when the text window is touched, the keypad E36 is displayed, and thus a process for preparing a user to chat is performed.

Figure 13:
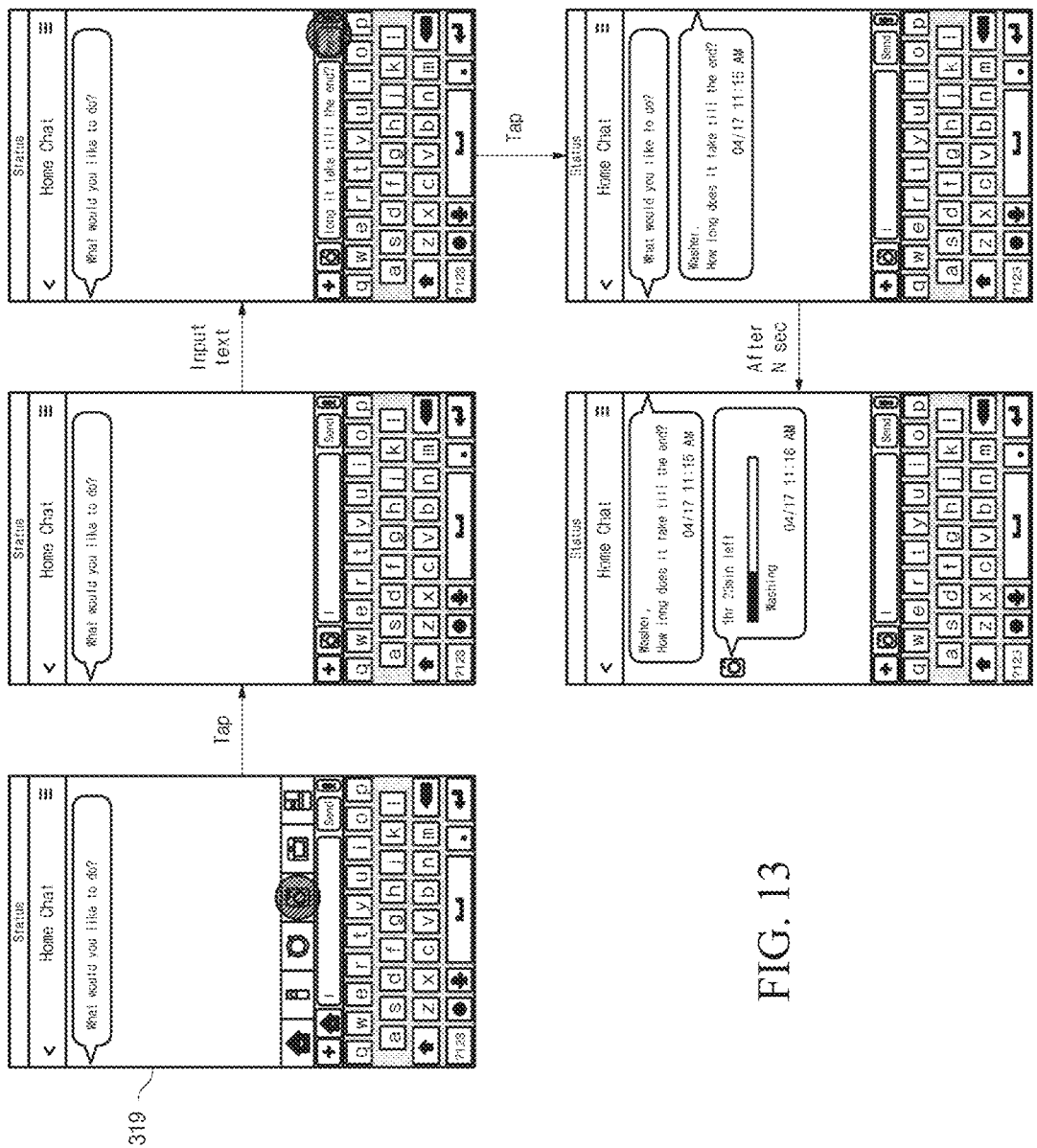

As shown in FIG. 13, when the icon of the washing machine is touched, the chatting screen 319 displays the icon of the washing machine on the target window. When the text window is touched, the chatting screen 319 displays the keypad E36, and thus performs a preparation process to allow the user to chat.

When a message for inquiring about a progress state of the washing machine is input, and then the send button is touched, the chatting screen 319 displays the input message on a representative display window, receives information regarding a current progress state from the washing machine, and displays the received progress state on a progress bar, etc.

In addition, the chatting screen displays a time at which the chatting word is input to the conversation display window together.

Figure 14:
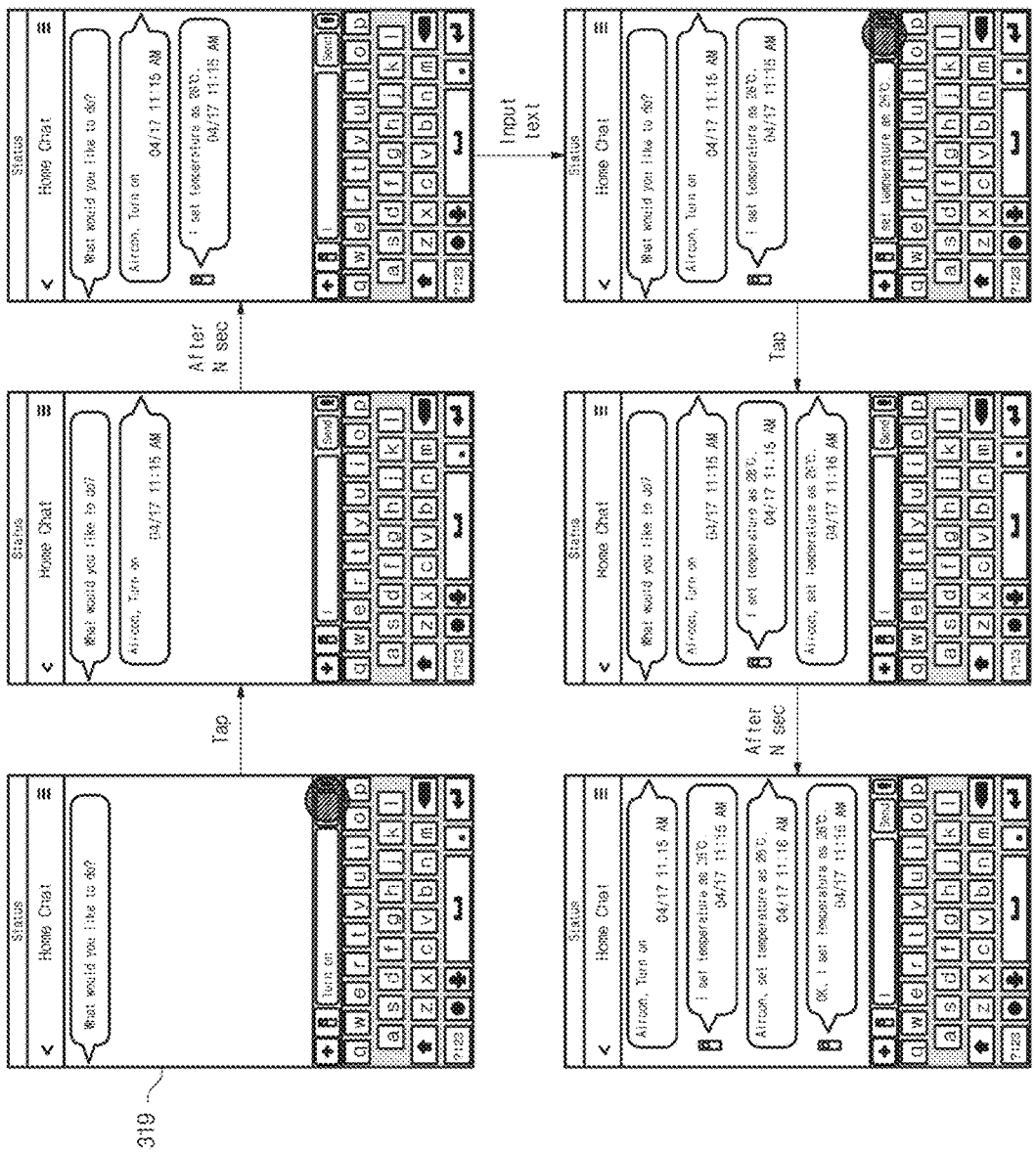

In addition, as shown in FIG. 14, when the icon of the air conditioner is touched, the chatting screen 319 displays the icon of the air conditioner on the target window. When the text window is touched, the chatting screen 319 displays the keypad E36, and thus performs a preparation process to allow the user to chat.

When an operation command is input through a message, and then the send button is touched, the chatting screen 319 displays the input on-operation command on the conversation display window and displays a current indoor temperature provided by the air conditioner. When a target indoor temperature is input through a message, and then the send button is touched, the chatting screen 319 displays the input target indoor temperature on the conversation display window, receives a response that the command will be performed from the air conditioner, and displays the received response on the conversation display window.

Figure 15:
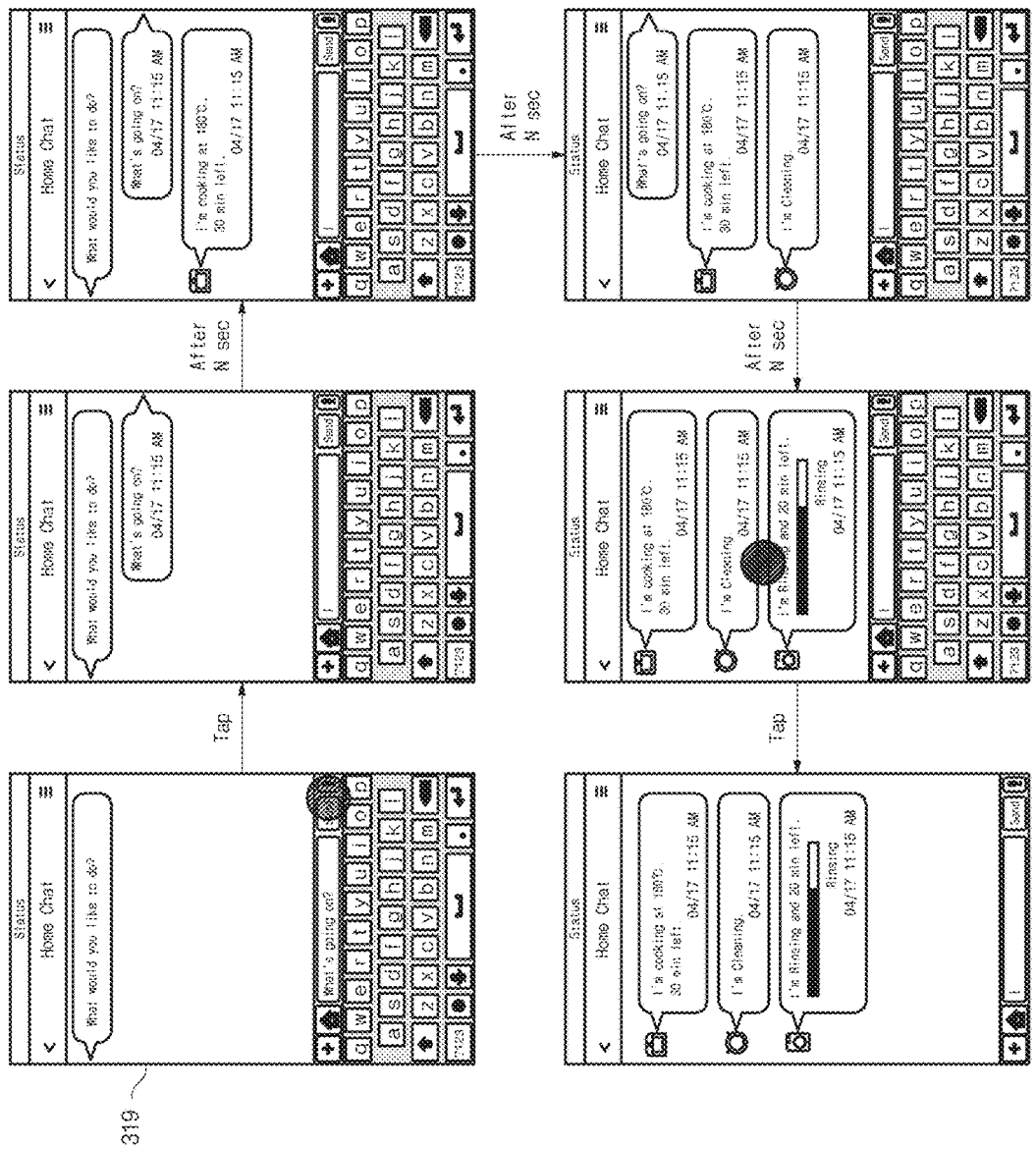

As shown in FIG. 15, when an icon for selecting all devices is selected, the chatting screen 319 displays the icon for selecting all devices on the target window. When the text window is touched, the chatting screen 319 displays the keypad E36 and thus performs a preparation process to allow the user to chat.

When a chatting word for monitoring all devices is input through a keypad, the chatting screen 319 displays the input chatting word on the conversation display window. When monitoring information is received from a pre-registered electric device, the chatting screen 319 displays the received monitoring information for each electric device on the conversation display window.

When the conversation display window is touched while the monitoring information for each electric device is displayed, the chatting screen 319 hides the keypad.

Figure 16:
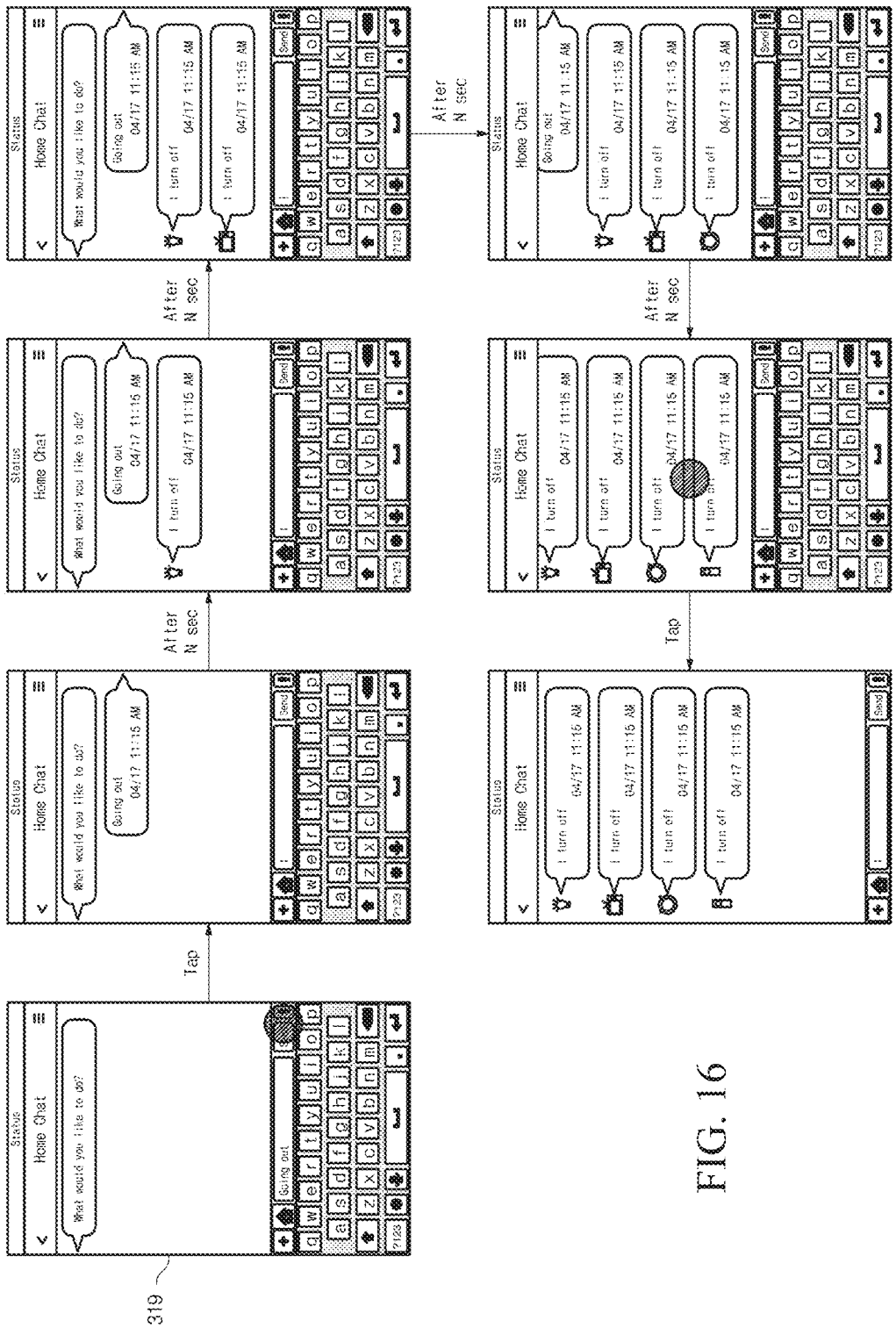

As shown in FIG. 16, when an icon for selecting all devices is selected, the chatting screen 319 displays the icon for selecting all devices on the target window. When the text window is touched, the chatting screen 319 displays the keypad E36 and thus performs a preparation process to allow the user to chat.

When a chatting word for informing all devices of the going-out is input through the keypad, the chatting screen 319 displays the input chatting word on the conversation display window. When operation state information corresponding to the going-out is received from a pre-registered electric device, the chatting screen 319 displays the received operation state information for each electric device on the conversation display window.

When the conversation display window is touched while the operation state information for each electric device is displayed, the chatting screen 319 hides the keypad.

When the icon of the air conditioner is touched, the chatting screen 319 displays the icon of the air conditioner on the target window. When the text window is touched, the chatting screen 319 displays the keypad E36 and thus performs a preparation process to allow the user to chat.

When an operation command is input through a message, and then the send button is touched, the chatting screen 319 displays the input on-operation command on the conversation display window and displays a current indoor temperature provided by the air conditioner. When a target indoor temperature is input through a message, and then the send button is touched, the chatting screen 319 displays the input target indoor temperature on the conversation display window, receives a response that the command will be performed from the air conditioner, and displays the received response on the conversation display window.

As shown in FIG. 12C, when the list button E33 is touched, the chatting screen 319 displays a plurality of shortcut buttons E37 on which respective chatting instructions are displayed and thus performs a preparation process to allow the user to chat.

Figure 17:
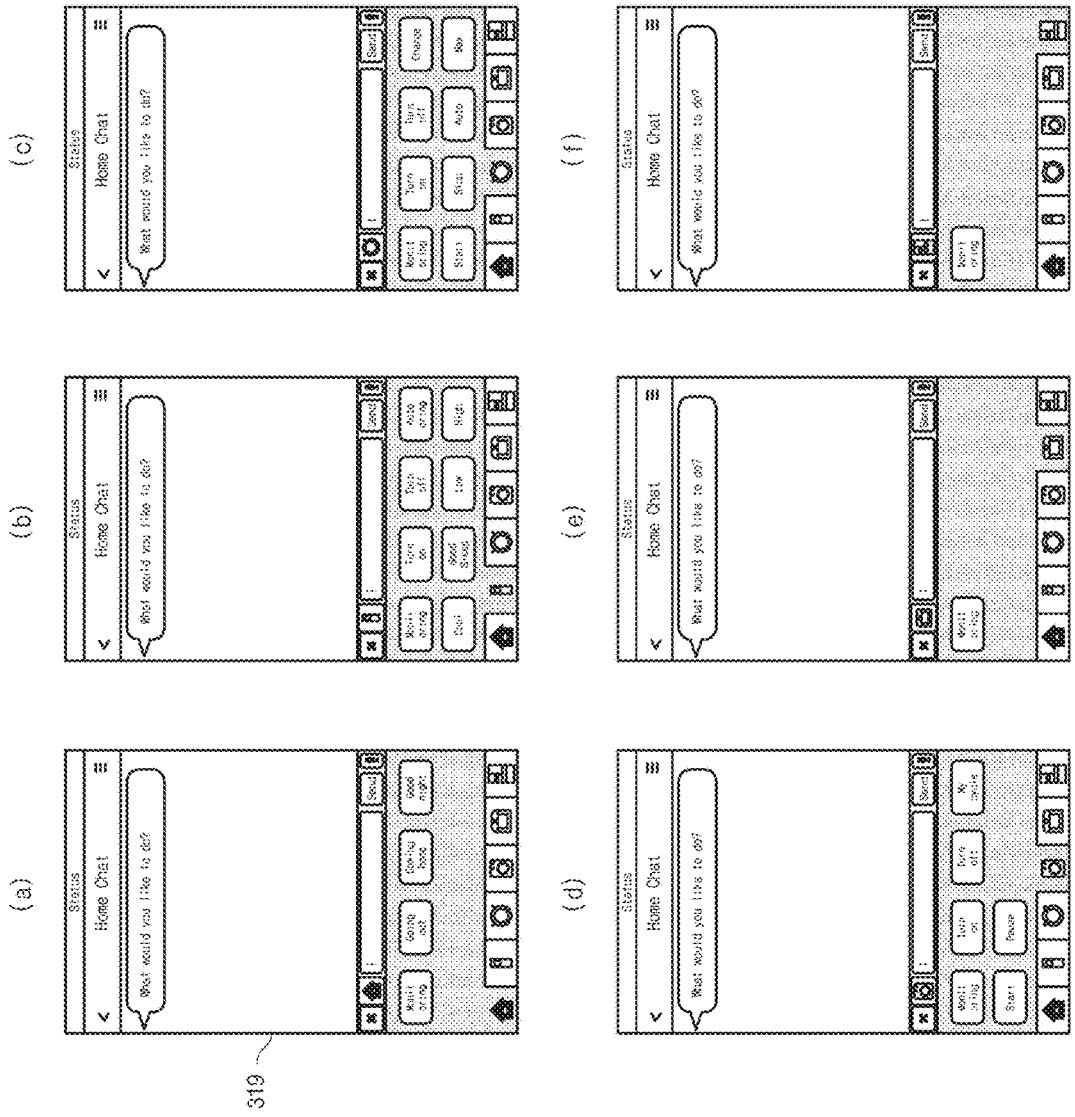

FIG. 17 shows an example of a shortcut button for each pre-registered electric device.

Portion (a) of FIG. 17 is an exemplary diagram of a shortcut button list corresponding to the icon for selecting all devices. When the icon for selecting all devices is selected, a plurality of shortcut buttons have respective operation commands for integrally controlling all of the pre-registered electric devices. In addition, the plurality of shortcut buttons for sending the control command to all devices correspond to buttons of the master key.

Portion (b) of FIG. 17 is an exemplary diagram of a shortcut button list corresponding to the operation control of the air conditioner, portion (c) of FIG. 17 is an exemplary diagram of a shortcut button list corresponding to the operation control of the robot cleaner, portion (d) of FIG. 17 is an exemplary diagram of a shortcut button list corresponding to the operation control of the washing machine, portion (e) of FIG. 17 is an exemplary diagram of a shortcut button list corresponding to the operation control of the cooking appliance, and portion (f) of FIG. 17 is an exemplary diagram of a shortcut button list corresponding to the operation control of the refrigerator.

Figure 18:
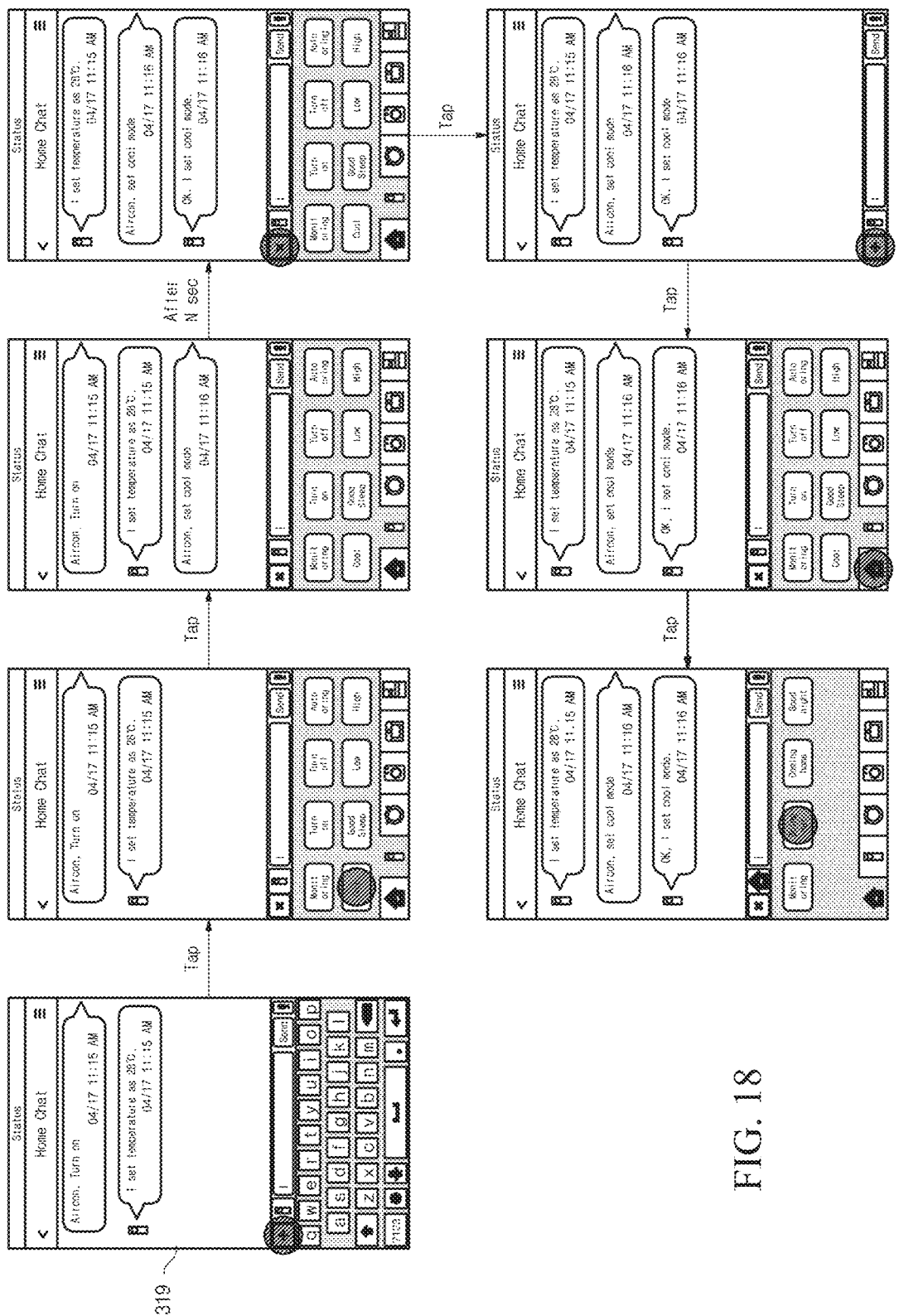

As shown in FIG. 18, when the icon of the air conditioner is touched, the chatting screen 319 displays the icon of the air conditioner on the target window. When information regarding a current indoor temperature is received from the air conditioner, the chatting screen 319 displays the received current indoor temperature on the conversation display window.

When the list button is touched, the chatting screen 319 displays the plurality of shortcut buttons E37 on which the chatting instructions for operation control associated with the air conditioner are displayed.

When a shortcut button for instructing air-conditioning is touched among the plurality of shortcut buttons, the chatting screen 319 displays a conversation corresponding to the touched shortcut button on the conversation display window, receives an operation state from the air conditioner, and displays a conversation of "an air conditioning operation will be performed." When the list button is touched after a predetermined period of time has passed, the chatting screen 319 hides the list button. Subsequently, when the list button in the conversation input window is touched, the chatting screen 319 displays the icon selection window and the shortcut button list.

When the icon for selecting all devices is touched while the icon selection window and the shortcut button list are displayed, the chatting screen 319 displays the icon for selecting all devices on the target window and displays a list of shortcut buttons corresponding to the icon for selecting all devices.

Subsequently, when the going-out button is touched among the plurality of shortcut buttons, the chatting screen 319 displays a conversation informing that the going-out button has been touched on the conversation display window and sends a preset operation command for each electric device corresponding to the going-out button to each electric device.

In addition, the chatting screen displays a time at which the chatting word is input to the conversation display window together.

As shown in FIG. 12D, when the microphone button E34 is touched, the chatting screen 319 displays a voice input window E38 for receiving a voice command and thus performs a preparation process to allow the user to chat.

As shown in FIG. 12D, when the icon of the washing machine is touched, the chatting screen 319 displays the icon of the washing machine on the target window. When the microphone button E34 is touched, the chatting screen 319 displays a voice input window E38 for inputting a voice command and thus performs a preparation process to allow the user to chat.

In addition, the voice input window includes a button for setting a voice command feedback, a button for inputting a voice, and a keypad switching button for performing switching to the keypad.

When a word is uttered while the button for inputting a voice is touched, the chatting screen 319 collects and then recognizes the voice through a microphone, and displays the recognized voice on the conversation display window. When a query corresponding to the recognized voice is about a progress state of the washing machine, the chatting screen 319 receives information regarding a current progress state from the washing machine and displays the received progress state using a progress bar, etc.

In addition, the chatting screen displays a time at which the chatting word is input to the conversation display window together.

The home view unit 314 may output interior images of the user's home at predetermined intervals. When a touch command is input, the home view unit 314 may expand a home view image and output the expanded image to the dashboard screen.

In addition, the home view unit 314 may output a previous image in response to the user's command.

Figure 19:
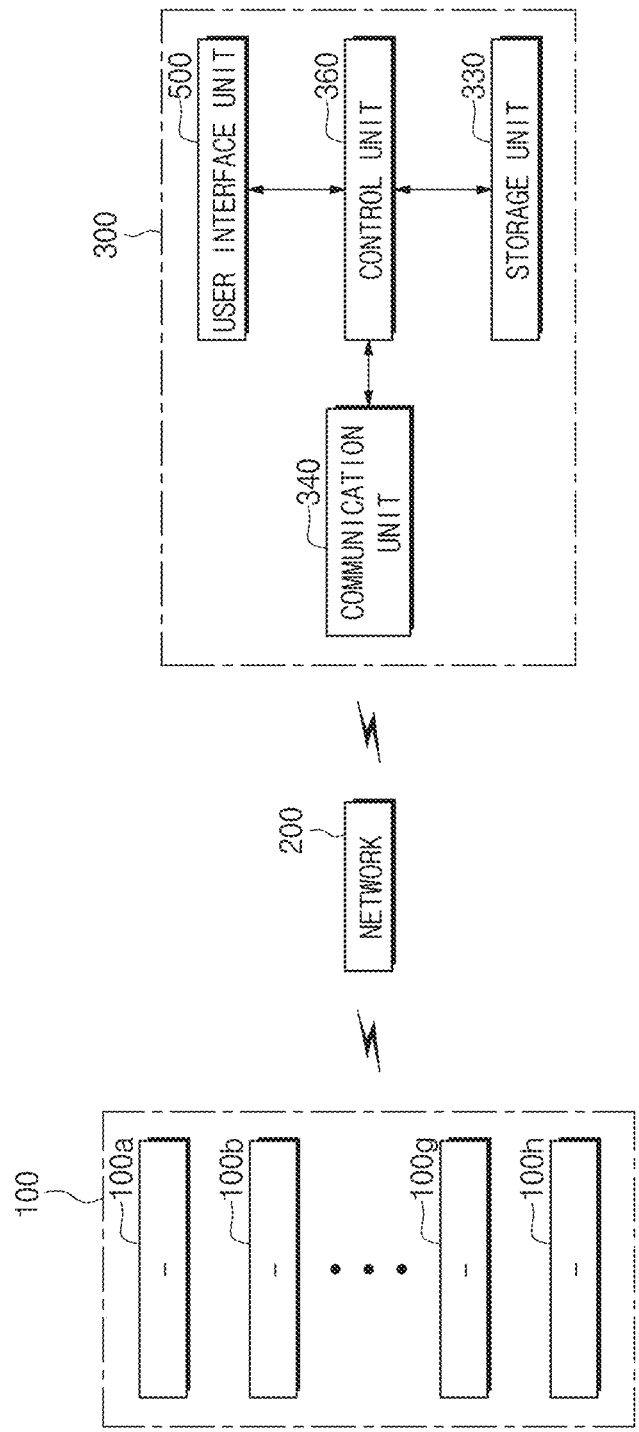
FIG. 19 is a control block diagram of a control device according to another embodiment.

FIG. 19 is a control block diagram of a control device according to another embodiment. A control device 300 includes a user interface unit 500, a control unit 360, a storage unit 330, and a communication unit 340.

A control device 300 communicates with another control device, and sends a control command to at least one of a plurality of electric devices on the basis of an operation command or information associated with the operation command sent by the other control device.

Here, the other control device is an information technology (IT) device that may be installed in a human body, and may be a wearable device provided as, e.g., a wrist watch, a belt, or glasses. The wearable device is capable of input/output and communication.

For example, the control device 300 may be a smartphone that communicates with a wrist-watch-type device, and the other control device may be a wrist-watch-type device.

Alternatively, the control device 300 may be a TV associated with a TV remote controller, and the other control device may be a separate TV remote controller.

That is, the other control device receives an operation command for at least one of a plurality of electric devices from a user and transmits the received operation command to a control device 300 which is pre-registered. An app for controlling an electric device in the home may be installed in the other control device.

Although not shown, the other control device may include an input unit.

Examples of an input through the input unit of the other control device may include a touch input, an electronic pen, a pointing device (e.g., a mouse, etc.), a keyboard, a voice, and an operation.

In addition, the other control device may include an output unit.

Examples of an output through the output unit of the other control device may include an output through a display unit such as a touch panel, etc., a voice output, a vibration output, and a light output.

The control device 300 and the other control device may be connected by wire or wirelessly. The wired connection scheme may include Mobile High-Definition Link (MHL) and Universal Serial Bus (USB), and the wireless connection scheme may include Bluetooth, WiFi, Zigbee, IrDA, and short-range communication.

Although not shown, a method of controlling an electric device using the control device 300 and the other control device will be described, for example, as follows.

The input through the other control device may be a voice input. When the other control device has a touch panel, the input may be a touch input.

On a condition that a control command is input to the other control device through the voice input, when the other control device transfers voice information to the control device 300, the control device 300 analyzes the voice, acquires a corresponding instruction, and performs a control operation corresponding to the instruction.

Alternatively, when the other control device digitalizes or encodes voice information and transfers the digitalized or encoded voice information to the control device 300, the control device 300 analyzes the digitalized or encoded information, acquires a corresponding instruction, and performs a control operation corresponding to the instruction.

Alternatively, when the other control device analyzes voice information and transfers specific information indicating a result of the analysis to the control device 300, the control device 300 acquires an instruction associated with the specific information and performs a control operation corresponding to the instruction.

Alternatively, when the other control device analyzes voice information, acquires an instruction corresponding to the voice information, and transmits the acquired instruction to the control device 300, the control device 300 performs a control operation corresponding to the instruction.

On a condition that a control command is input to the other control device through the touch input, when the other control device transfers information corresponding to a touched icon to the control device 300, the control device 300 acquires an instruction corresponding to the information and performs a control operation corresponding to the instruction.

Alternatively, when the other control device acquires the corresponding instruction through the information corresponding to the touched icon and transmits the acquired instruction to the control device 300, the control device 300 performs a control operation corresponding to the instruction.

Here, the control command may be a command for controlling a plurality of devices.

When the command for controlling the plurality of electric devices is input to the other control device, the other control device determines whether the input command is the command for controlling the plurality of electric devices and transmits a result of the determination to the control device 300.

The determination result may be transmitted simultaneously with, or separately from, the input command. Alternatively, when the other control device determines whether the input command is the command for controlling the plurality of electric devices, and then the input command is a command for controlling the plurality of electric devices, the other control device directly transmits a control command to electric devices to be controlled, instead of through the control device 300.

Alternatively, when the command for controlling the plurality of electric devices is input to the other control device, the control device 300 determines whether the command for controlling the plurality of electric devices is valid and performs a corresponding control operation.

When using the other control device as described above, the user may simply control a home electric device through a wrist-watch-type device or a TV remote controller.

For example, the user may collectively power off home appliances by saying, to the wrist-watch-type device, "Good night."

The control device 300 includes a user interface unit 500, a control unit 350, a storage unit 330, and a communication unit 340.

The user interface unit 500 outputs operation states of pre-registered electric devices among the plurality electric devices disposed in the home, and receives an operation command for at least one of the pre-registered electric devices.

The user interface unit 500 includes a display unit for displaying the operation states of the pre-registered electric devices, and an input unit for receiving the operation command from the user.

Here, the input unit is a touch panel for receiving an operation command, and the user interface unit 500 may be implemented as a touch screen in which a display panel of the display unit and the touch panel of the input unit are integrally formed.

In addition, the input of the input unit may be received through an electronic pen, a pointing device (e.g., mouse, etc.), a keyboard, voice recognition, and gesture recognition in addition to the touch panel.

In this case, the input unit may be formed separately from the display panel of the display unit. However, when the input unit is a touch type electronic pen, the input unit may be formed integrally therewith.

Figure 20:
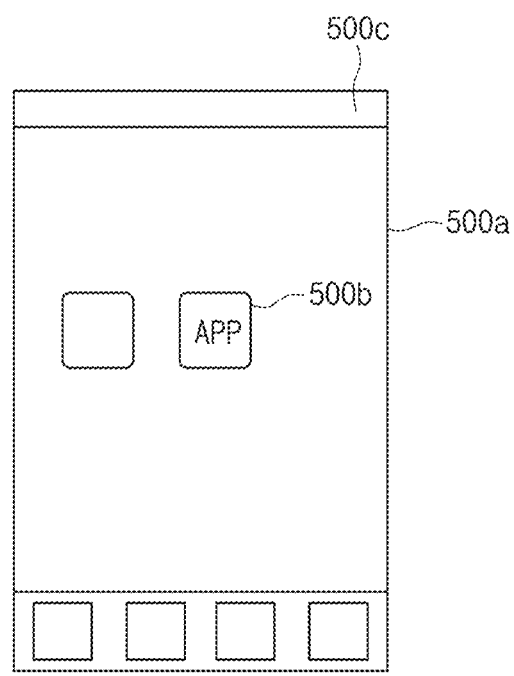
FIG. 20 is an exemplary diagram showing the display of a home screen of a control device according to another embodiment.

As shown in FIG. 20, the user interface unit 500 displays an icon 500b of an app for monitoring and controlling an electric device on the home screen 500a, transmits an app selection signal to the control unit 360 when the icon of the app is selected by the user, and displays a screen corresponding to execution of the app on the basis of a command of the control unit 360.

The user interface unit 500 includes a home screen 500a on which icons of various apps are displayed. The user interface unit 500 further includes a quick panel window 510 that is disposed in an upper portion of the home screen 500a in a hidden state, is displayed in a portion of the home screen 500a when an upper bar 500c of the home screen 500a is dragged, and is configured to display an application in use, a file download, music being played, or the like. Icons associated with various settings such as WiFi, GPS, Sound, Screen rotation, Power saving, Block, Bluetooth, Read/write, and P2P are arranged in the quick panel window 510.

That is, the quick panel window 510 may easily release or execute the various settings and may allow a user to easily check an application being executed or the like.

Such a quick panel window 510 includes a notification window 510a for informing the user of update information of at least one app, etc.

The notification window 510a informs about details of functions being executed such as an application being executed or a degree of download progress. When a corresponding list is selected, a shortcut may be executed.

That is, a variety of information for managing an operation state of a pre-registered electric device or managing the electric device is displayed in the notification window 510a. The notification window 510a may display event information only when an event associated with an electric device and needing notification information has occurred.

Furthermore, the user interface unit may also display event information of the electric device in an upper bar of the home screen as a shortcut.

As shown in FIG. 22, when an event needing notification information associated with an electric device occurs while the home screen 500a is displayed as shown in FIG. 20, the user interface unit may display notification information on the home screen 500a through a positive/negative pop-up p2.

For example, the user interface unit displays an event such as "perform a drying process after washing is done? (Y/N)," "perform a docking process after cleaning is done? (Y/N)," and "perform a washing process when a door of a washing machine is opened? (Y/N)" or a new function such as "perform or cancel home view" on the home screen through the positive/negative pop-up p2.

The user moves to a chatting screen 520 through the notification window 510*a* of the quick panel window 510 or through the positive/negative pop-up p2.

Upon movement to the chatting screen, an electric device displayed on the notification window 510*a* or the pop-up window p is a chatting companion. The control unit 360 of the control device may control the electric device through chatting.

When the upper bar 500*c* of the home screen is dragged, the control unit 360 controls the display of the quick panel window 510. When the notification window 510*a* of the quick panel window 510 is touched, the control unit 360 controls a chatting screen to be displayed.

The control unit 360 may control a control screen or a service screen to be displayed according to a touch position, a touch type, or a touch direction of a touch of the notification window 510*a*.

Here, the touch position includes a message region and an icon region, and the touch type includes a tap and a long tap, and the touch direction includes a sliding direction.

When the notification window 510*a* is touched, the control unit 360 may control a mini control window to be displayed.

The storage unit 330 stores identification information of home electric devices registered by the user and an app for monitoring and controlling the pre-registered electric devices.

The storage unit 330 stores an operation command for each touch position, an operation command for each touch type, and an operation command for each touch direction.

The communication unit 340 communicates with an electric device and a home server in the home.

The communication unit 340 performs communication with another control device.

An embodiment of moving to the chatting screen through the notification window 510*a* of the quick panel window 510 and controlling an electric device will be described in detail with reference to FIGS. 21 and 23 to 28. Even when moving to the chatting screen through the positive/negative pop-up p and controlling the electric device, operations to be performed after the movement to the chatting screen are the same, and thus a separate description thereof will not be provided.

Figure 21:
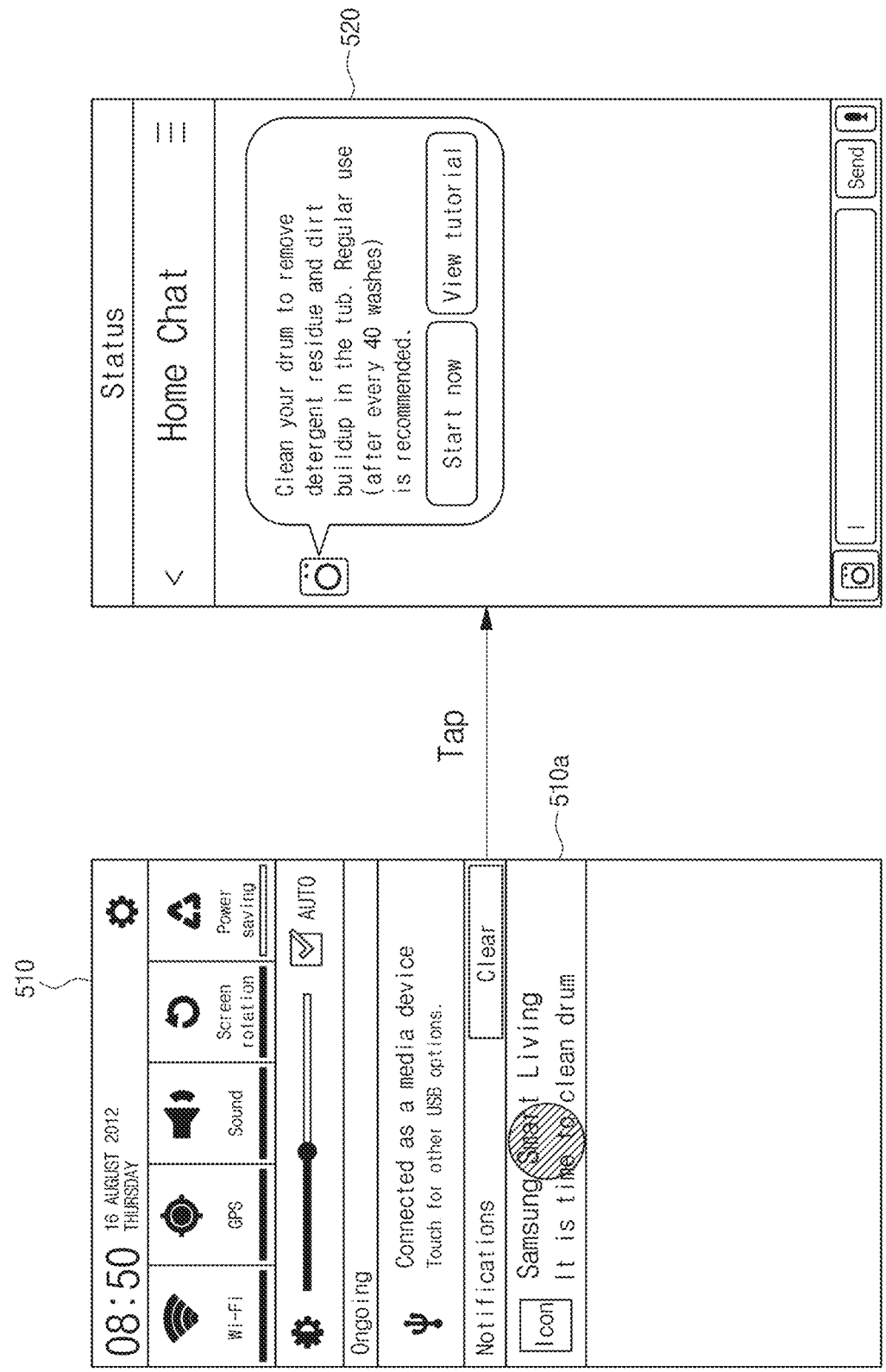
FIG. 21 is an exemplary diagram showing a quick panel window displayed on a home screen of a control device according to an embodiment.
Figure 23:
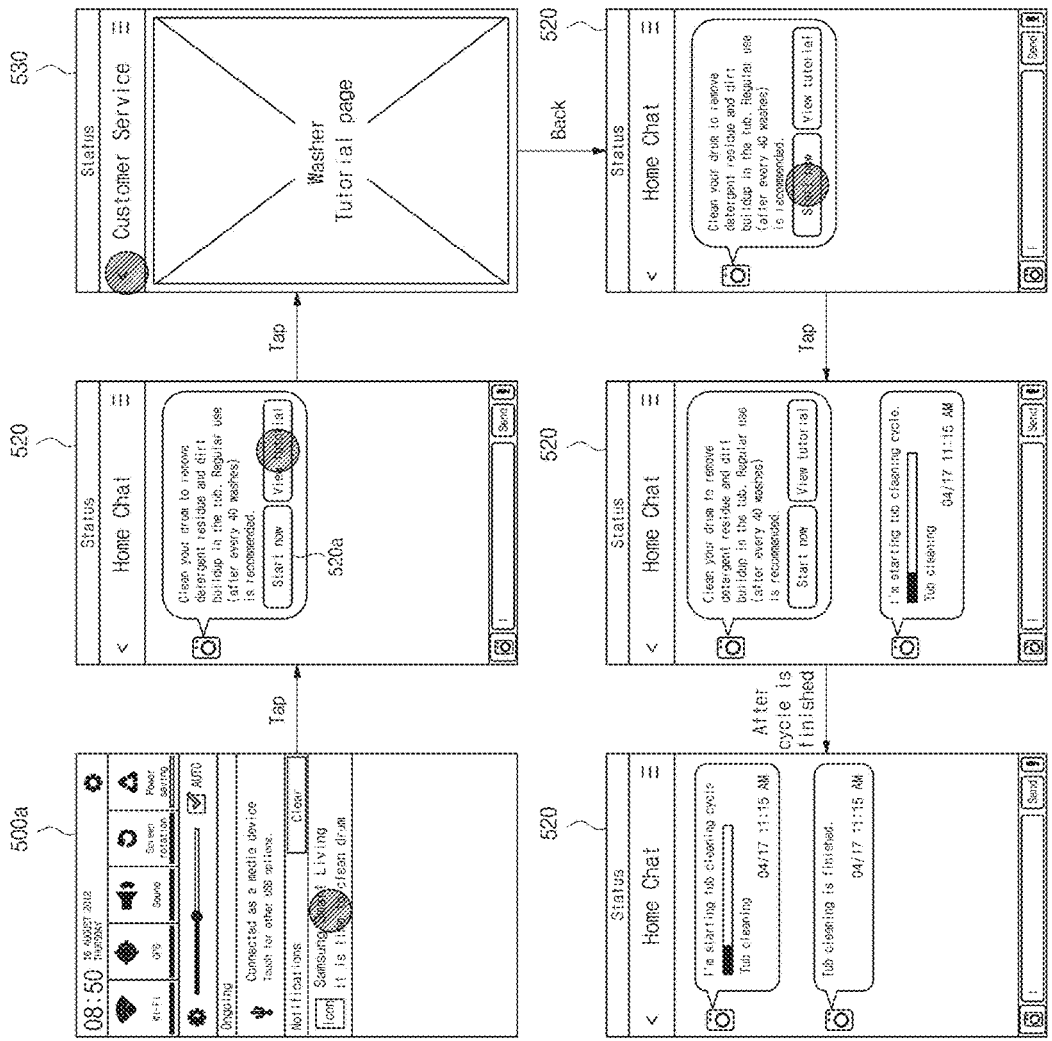

FIGS. 21 and 23 are an exemplary diagram of a quick panel window and a chatting screen displayed on the home screen of the control device according to another embodiment.

The control device determines whether an event which needs to be informed to the user has occurred in at least one electric device. When it is determined that the event which needs to be informed has occurred, the control device displays notification information corresponding to the occurrence of the event on the home screen 500*a* of the user interface unit 500 through the quick panel window 510.

That is, the user interface unit 500 further includes the notification window 510*a* disposed in the quick panel window 510 of the home screen 500*a* and configured to display event information of the electric device.

In addition, while the app is not executed, the control device may display notification information on an update, an error, and a management period of the at least one electric device through the quick panel window on the home screen.

When the notification information of the notification window 510*a* is touched, the user interface unit 500 displays information on the electric device in the chatting screen 520 in detail.

When the notification information is event information associated with an operation error, the user interface unit 500 may also display a troubleshooting method or troubleshooting information together for addressing a corresponding event.

The user interface unit 500 may further display a shortcut button for executing the troubleshooting method or the troubleshooting information.

When the notification information is information associated with the cleaning of a laundry drum, the user interface unit 500 displays information associated with the cleaning of the laundry drum in the chatting screen 520 and displays a shortcut button 520*a* for performing an operation associated with the cleaning of the laundry drum.

For example, when a "view tutorial button" in the chatting screen 520 is touched as an input, the user interface unit displays a tutorial of a corresponding electric device on the service screen 540. When a "start now button" in the chatting screen 520 is touched as an input, the user interface unit transmits a laundry drum clean command to the washing machine, displays a laundry drum clean process in the chatting screen 520, and displays information associated with the completion of the cleaning of the laundry drum when the cleaning of the laundry drum is completed.

Figure 24:
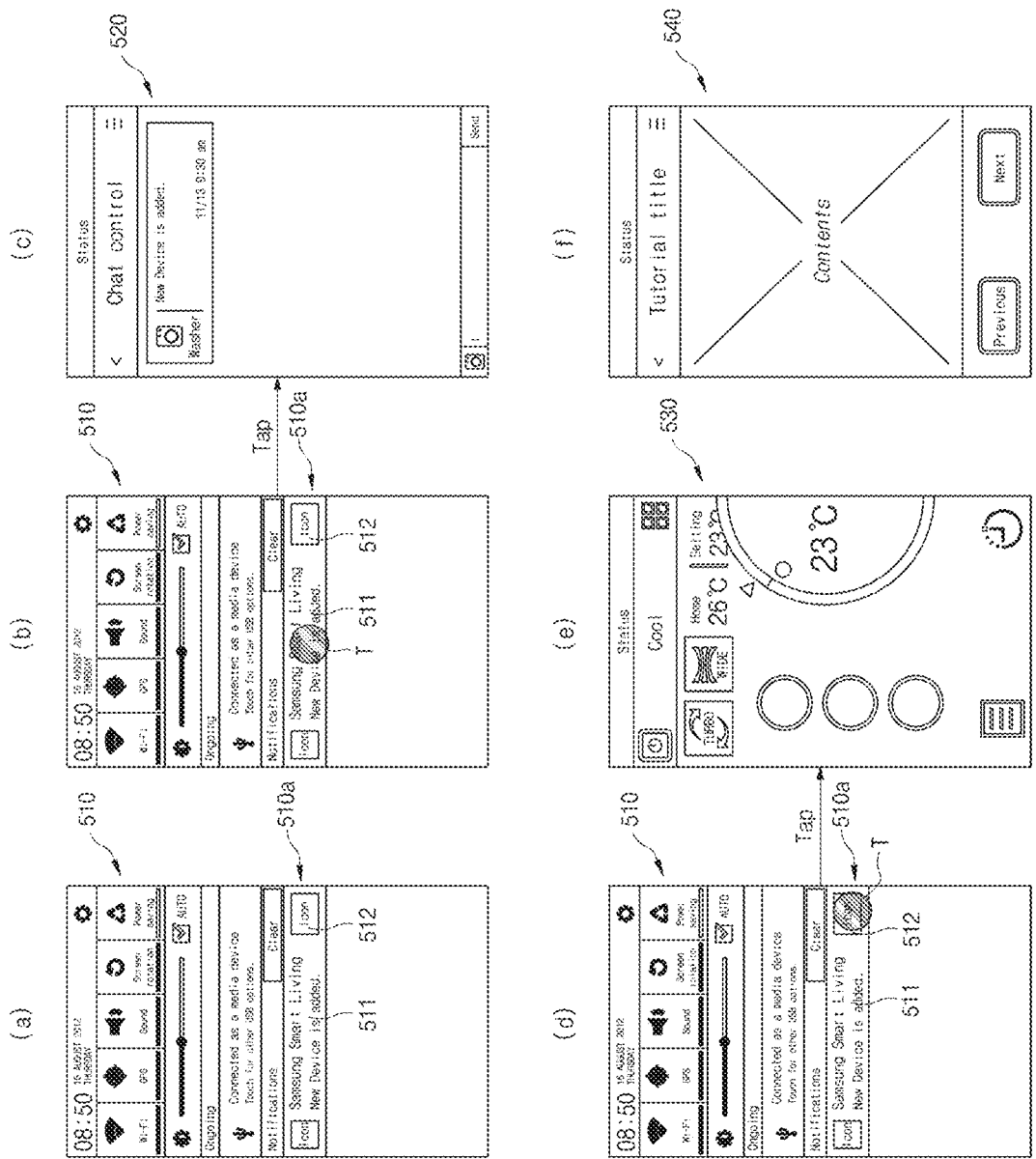

FIG. 24 is another exemplary diagram of a quick panel window displayed in the home screen of a control device according to another embodiment.

As shown in portion (a), the user interface unit 500 displays the notification window 510*a* disposed in the quick panel window 510 of the home screen 500*a* and configured to inform of event information on the electric device.

The notification window 510*a* includes a message unit 511 configured to display event information of an electric device and a button unit 512 having at least one button for screen transition disposed therein.

As shown in portions (b) and (c), when the message unit 511 of the notification window 510*a* is touched as an input, the user interface unit 500 switches the home screen to the chatting screen and then displays the chatting screen, and displays information on a corresponding electric device in the chatting screen 520.

Subsequently, the control device may check state information of the corresponding electric device through the chatting screen or control the corresponding electric device through chatting.

As shown in portions (d) and (e), when the button unit 512 of the notification window 510*a* is touched as an input, the user interface unit 500 switches the home screen to the control screen 530 and then displays the control screen 530, which outputs an operation control button and an operation state information to control an operation for the electric device.

For example, when the electric device is an air conditioner, the user interface unit displays a target temperature, an operation mode, an indoor temperature, etc. on the control screen 530 and displays a temperature adjustment button and a reservation button to adjust the target temperature.

As shown in portions (d) and (f), when the button unit 512 of the notification window 510*a* is touched as an input, the user interface unit 500 switches the home screen to the service screen 540 and then displays the service screen 540, and may display service information on the corresponding electric device. For example, the user interface unit 500 outputs a tutorial program (Tutorial) or the like to the service screen 540.

Information associated with transition into the control screen or the service screen is set in a button of the button unit 512. This may be set by a user.

The button unit 512 may include a plurality of screen transition buttons for performing direct transition to the control screen and the service screen.

Figure 25:
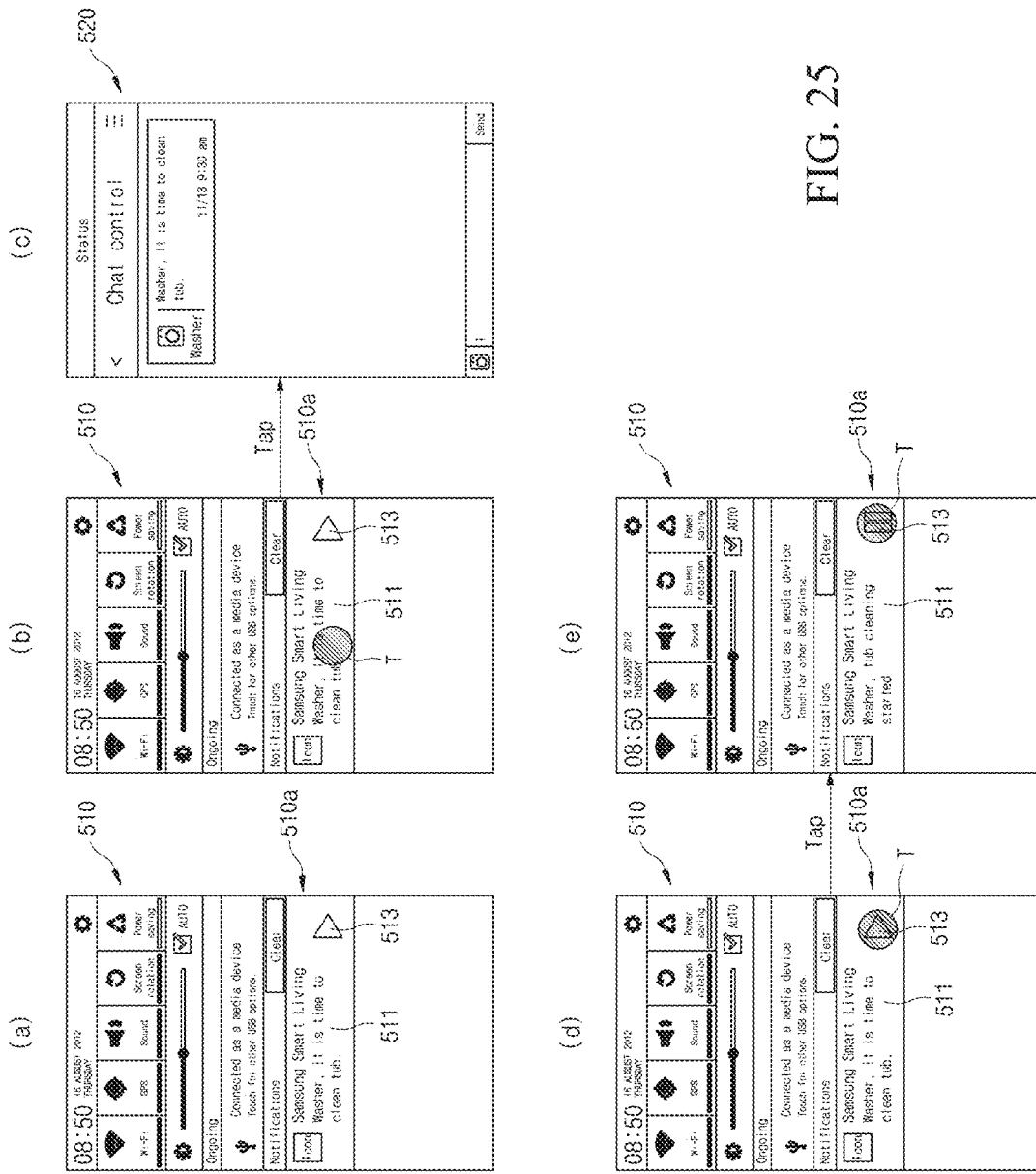

FIG. 25 is still another exemplary diagram of a quick panel window displayed in the home screen of a control device according to another embodiment.

As shown in portion (a), the user interface unit 500 displays the notification window 510*a* disposed in the quick panel window 510 of the home screen 500*a* and configured to inform of event information on the electric device.

The notification window 510*a* includes a message unit 511 configured to display event information of an electric device and a button unit 513 having a shortcut button for receiving an operation command for the electric device disposed therein.

As shown in portions (b) and (c), when the message unit 511 of the notification window 510*a* is touched as an input, the user interface unit 500 switches the home screen to the chatting screen and then displays the chatting screen, and displays information on a corresponding electric device in the chatting screen 520.

Subsequently, the control device may check state information of the corresponding electric device through the chatting screen or control the corresponding electric device through chatting.

As shown in portions (d) and (e), when the button unit 513 of the notification window 510*a* is touched as an input, the user interface unit 500 controls an operation state of the electric device to be changed and displays the current operation state of the electric device having the changed operation state using another button or another notification window. Alternatively, the user interface unit 500 changes the original notification window 510*a* and displays the current operation state in the changed notification window 510*a*.

For example, when the current operation state of the electric device is an off state, the quick panel window 510 displays an on button in the button unit 513 of the notification window 510*a*. When an off button is touched as an input by a user, the quick panel window 510 transmits an execution command to the electric device and displays a stop button or a pause button.

For example, when the message displayed through the notification window 510*a* is a message for informing about a washing time, the quick panel window 510 displays an execution button in the button unit 513, thus allowing a user to simply execute a washing operation without needing to move to a separate control screen by selecting an execution button when the user intends to execute the washing operation.

That is, the quick panel window displays a button of another state that is changeable from the current state.

FIG. 26 is still another exemplary diagram of a quick panel window displayed in the home screen of a control device according to another embodiment.

As shown in portion (a), the user interface unit 500 displays the notification window 510*a* disposed in the quick panel window 510 of the home screen 500*a* and configured to inform of event information on the electric device.

The notification window 510*a* includes a message unit 511 that displays the event information on the electric device.

As shown in portion (b), when the message unit 511 of the notification window 510*a* is touched, the user interface unit 500 checks a touch direction. When the checked touch direction is a direction changing from left to right, the user interface unit 500 determines that the touch is a first drag D1, checks an operation command corresponding to the first drag, and performs the checked operation command.

That is, the user interface unit switches the home screen to the chatting screen and displays the chatting screen, and displays information on a corresponding electric device on the chatting screen 520.

As shown in portion (c), when the message unit 511 of the notification window 510*a* is touched, the user interface unit 500 checks a touch direction. When the checked touch direction is a direction changing from right to left, the user interface unit 500 determines that the touch is a second drag D2, checks an operation command corresponding to the second drag, and performs the checked operation command.

That is, the user interface unit switches the home screen to the control screen 530 and displays the control screen 530, and displays information on a corresponding electric device on the control screen 530.

As shown in portion (d), when the checked touch direction is a direction changing from right to left, the user interface unit 500 switches the home screen to the service screen 540 and displays the service screen 540 and may display service information on a corresponding electric device. For example, the user interface unit 500 outputs a tutorial program (Tutorial) or the like to the service screen 540.

The control device pre-stores information on a screen to be switched to according to a touch direction, that is, a drag direction. This may be set by a user.

In this way, the screen may be switched corresponding to the touch direction moving up or down in the notification window in addition to the touch direction moving left or right.

FIG. 27 is still another exemplary diagram of a quick panel window displayed in the home screen of a control device according to another embodiment.

As shown in portion (a), the user interface unit 500 displays the notification window 510*a* disposed in the quick panel window 510 of the home screen 500*a* and configured to inform of event information on the electric device.

The notification window 510*a* includes a message unit 511 that displays the event information on the electric device.

Although not shown, when a tap having a touch time equal to or less than a certain time is touched, the message unit 511 of the notification window 510*a* switches the home screen to the chatting screen and displays the chatting screen, and displays information on a corresponding electric device on the chatting screen 520.

Subsequently, the state information of the corresponding electric device may be checked through the chatting screen or the electric device may be controlled through chatting.

As shown in portion (b), when the message unit 511 of the notification window 510*a* is touched and the touch is a long tap having a touch time equal to or greater than a certain time, the user interface unit 500 switches the home screen to the control screen 530 and displays the control screen 530, and displays information on a corresponding electric device on the control screen 530.

In addition, as shown in portion (c), when the message unit 511 of the notification window 510*a* is touched and the touch is a long tap having a touch time equal to or greater than a certain time, the user interface unit 500 may expand the notification window 510*a* and further display the mini control window 514 in the expanded notification window 510*a*.

Here, the mini control window 514 includes an on/off button, a start button, a stop button, and a pause button, or the like to simply control the electric device.

As shown in portion (d), when the message unit 511 of the notification window 510*a* is touched and the touch is a long tap having a touch time equal to or greater than a certain time, the user interface unit 500 displays the mini control window 514 over the notification window 510*a*.

In this example, it has been described that the mini control window is displayed when the long tap is input. However, the mini control window may be displayed corresponding to a tap or shake.

Figure 28:
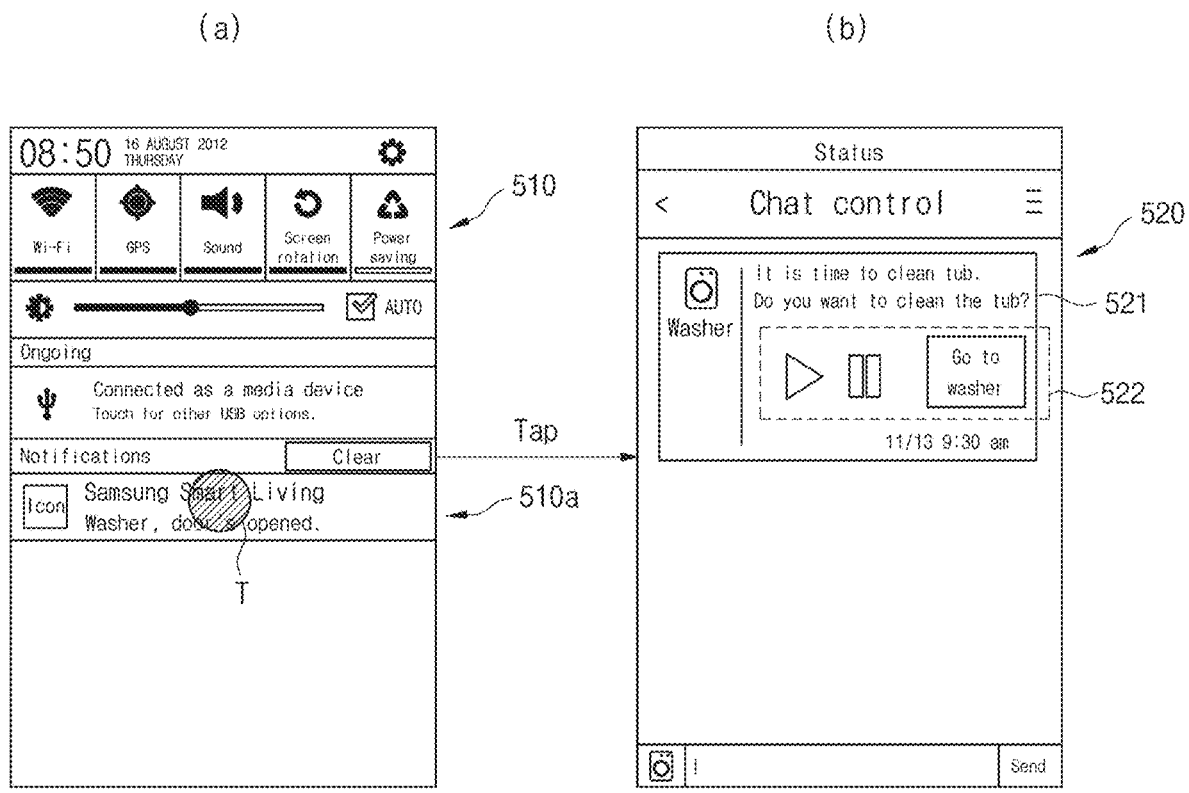

FIG. 28 is still another exemplary diagram of a quick panel window displayed in the home screen of a control device according to another embodiment.

As shown in portion (a), the user interface unit 500 displays the notification window 510*a* disposed in the quick panel window 510 of the home screen 500*a* and configured to inform of event information on the electric device.

The notification window 510*a* includes a message unit 511 that displays the event information on the electric device.

As shown in portion (b), when the message unit 511 of the notification window 510*a* is touched as an input, the user interface unit 500 switches the home screen to the chatting screen 520 and then displays the chatting screen, and displays information on a corresponding electric device on the chatting screen 520 while displaying the mini control window 522 over a conversation window 521 of the chatting screen.

A method of a control device according to another embodiment will also be described, which is described with reference to FIG. 24.

The control device determines whether notification information has been received from at least one of home electric devices that are pre-registered.

When it is determined that the notification information has been received, the control device outputs the notification information received through a quick panel window of a home screen.

Here, the output of the notification information received through the quick panel window of the home screen may also include displaying an emoticon for informing that the notification information has been received in an upper bar of the home screen and displaying the notification information on the home screen 500*a* through the positive/negative pop-up p.

Furthermore, a predetermined sound may be used to inform that an event of at least one electric device has occurred.

The user moves to the chatting screen 520 through the notification window 510*a* of the quick panel window 510 or through the positive/negative pop-up p.

When the upper bar 500*c* of the home screen is dragged, the control device controls the display of the quick panel window 510 and determines whether a first region corresponding to a message unit in the notification window 510*a* of the quick panel window 510 has been selected. When it is determined that the first region has been selected, the control device displays a chatting screen on the user interface unit.

On the other hand, when it is determined that a second region corresponding to a button unit 512 in the notification window 510*a* of the quick panel window 510 has been selected, the control device displays a control screen in the user interface unit.

In the embodiment, the control of the display of the screen has been described on the basis of the touched region. However, the display of the screen may be controlled on the basis of a touch type or a touch direction.

What is claimed is:

1. A control device, comprising:
   a display;
   an input device configured to receive user inputs, the input device comprising a touch panel integrally provided on the display;
   a communicator configured to communicate with an electric device; and
   a controller configured to:
     in response to an input being received on an upper portion of a screen displayed on the display, control the display to display notification information on a quick panel window on a part of a first screen, the notification information comprising information corresponding to a change in an operation state of the electric device,
     in response to receiving a touch on the notification information of the quick panel window, identify a touch direction of the touch on the notification information based on a touch signal received by the touch panel as a user input,
     based on the identified touch direction being a first direction changing from a first position to a second position, control the display to change the first screen to a second screen,
     based on the identified touch direction being a second direction opposite to the first direction and changing from the second position to the first position, control the display to change the first screen to a third screen,
     in response to the touch direction not being identified, identify a touch time on the notification information,
     based on the identified touch time being less than a predetermined time, control the display to change the first screen to the second screen, and
     based on the identified touch time being equal to or greater than the predetermined time, control the display to change the first screen to the third screen,
   wherein the second screen is one of a chatting screen for inputting and displaying a conversation with the electric device, a control screen for controlling the electric device, or a service screen for receiving a service for the electric device as the second screen, and
   wherein the third screen is one of the chatting screen, the control screen, or the service screen, and the third screen is a screen different from the second screen.

2. The control device of claim 1,
   wherein the quick panel window comprises a message region displaying the notification information and a button region displaying a button for receiving an operation command for the electric device, and
   wherein the controller is further configured to:
     in response to receiving a touch in the message region, control the display to change the first screen to the chatting screen, and in response to receiving a touch in the button region, control the display to change the first screen to one of the control screen or the service screen based on the notification information.

3. The control device of claim 2, wherein the controller is further configured to:
identify touch information of one of a touch position or a touch type of the touch of the quick panel window based on the touch signal, and
control the display to display one of the second screen or the third screen based on the touch information.

4. The control device of claim 2,
wherein the touch position comprises the message region and the button region, and
wherein the touch direction comprises a sliding direction.

5. The control device of claim 1, wherein the controller is further configured to control the display to display information corresponding to at least one of an update, an error, or a management period of the electric device in the quick panel window.

6. The control device of claim 1, wherein the controller is further configured to determine whether the operation state of the electrical device is changed while an application for controlling the electrical device is not being executed.

7. The control device of claim 1, wherein the controller is further configured to control transmission of a signal corresponding to an operation command for the electric device based on the user input received by the input device.

8. The control device of claim 1, wherein the quick panel window comprises icons associated with various settings of the control device.

9. The control device of claim 1, wherein the controller is further configured to, in response to the input being received on the upper portion of the screen displayed on the display while the quick panel window is in a hidden state, control the display to display the quick panel window and the notification information on the part of the first screen.

10. The control device of claim 1, wherein the notification information displayed on the quick panel window is displayed in the quick panel window only in a case that the change in the operation state of the electric device occurs and the notification information is needed.

11. A control device, comprising:
a display;
an input device configured to receive user inputs, the input device comprising a touch panel integrally provided on the display;
a communicator configured to communicate with an electric device; and
a controller configured to:
in response to an input being received on an upper portion of a screen displayed on the display, control the display to display notification information on a quick panel window on a part of a first screen, the notification information comprising information corresponding to a change in an operation state of the electric device,
in response to receiving a touch on the notification information of the quick panel window, identify a touch direction of the touch on the notification information based on a touch signal received by the touch panel as a user input,
based on the identified touch direction being a direction changing from a first position to a second position, control the display to change the first screen to a second screen,
based on the identified touch direction being a direction changing from the second position to the first position, control the display to change the first screen to a third screen,
in response to the touch direction not being identified, identify a touch time on the notification information,
based on the identified touch time being less than a predetermined time, control the display to change the first screen to the second screen, and
based on the identified touch time being equal to or greater than the predetermined time, control the display to change the first screen to the third screen,
wherein the second screen is one of a chatting screen for inputting and displaying a conversation with the electric device, a control screen for controlling the electric device, or a service screen for receiving a service for the electric device as the second screen, and
wherein the third screen is one of the chatting screen, the control screen, or the service screen, and the third screen is a screen different from the second screen.

12. The control device of claim 11,
wherein the quick panel window comprises a button region displaying buttons for receiving operation commands for the electric device, and
wherein the controller is further configured to, in response to one of the buttons in the button region being touched, control transmission of an operation command corresponding to the touched button.

13. The control device of claim 12,
wherein the quick panel window further comprises a message region displaying the notification information, and
wherein the controller is further configured to, in response to receiving a touch in the message region, control the display to display one of the chatting screen, the control screen, or the service screen.

14. The control device of claim 12,
wherein the quick panel window further comprises a message region displaying the notification information, and
wherein the controller is further configured to:
identify touch information of one of a touch position or a touch type of a touch of the message region based on the touch signal, and
control the display to display one of the chatting screen, the control screen, or the service screen.

15. The control device of claim 11, wherein the controller is further configured to, in response to the change in the operation state of the electric device, control the display to display information on operation commands for changing the operation state of the electric device.

16. The control device of claim 11, wherein the controller is further configured to control the display to display information corresponding to at least one of an update, an error, or a management period of the electric device in the quick panel window.

17. The control device of claim 11, wherein the controller is further configured to determine whether the operation state of the electrical device is changed while an application for controlling the electrical device is not being executed.

* * * * *